United States Patent
Petherick

(10) Patent No.: US 12,537,560 B2
(45) Date of Patent: *Jan. 27, 2026

(54) DATA ENCODING IN A LOW FREQUENCY MAGNETIC FIELD

(71) Applicant: Metrotech Corporation, Santa Clara, CA (US)

(72) Inventor: Stephen John Petherick, Exeter (GB)

(73) Assignee: Metrotech Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/419,187

(22) Filed: Jan. 22, 2024

(65) Prior Publication Data
US 2025/0240052 A1    Jul. 24, 2025

(51) Int. Cl.
*H04B 5/24* (2024.01)

(52) U.S. Cl.
CPC ..................... *H04B 5/24* (2024.01)

(58) Field of Classification Search
CPC ....................................... H04B 5/24
See application file for complete search history.

(56) References Cited

U.S. PATENT DOCUMENTS

| | | | |
|---|---|---|---|
| 2013/0307544 A1 | 11/2013 | Cole | |
| 2018/0010447 A1 | 1/2018 | Zeller | |
| 2020/0076474 A1* | 3/2020 | Daga | H02J 50/10 |
| 2023/0353256 A1* | 11/2023 | Rhodes | H04B 5/24 |

FOREIGN PATENT DOCUMENTS

| | | |
|---|---|---|
| CN | 103187998 A | 7/2013 |
| KR | 20000039664 A | 7/2000 |

OTHER PUBLICATIONS

International Search Report and Written Opinion for PCT/US2025/012174, dated Apr. 1, 2024, 9 pages.

* cited by examiner

*Primary Examiner* — Jeffrey M Shin
(74) *Attorney, Agent, or Firm* — Haynes and Boone, LLP

(57) ABSTRACT

A method of data transmission includes transmitting a magnetic signal that is modulated with the bit stream, the magnetic signal having a nominal frequency and being formed of a high frequency and a low frequency, the nominal frequency being the average frequency of the magnetic signal. The bit stream is modulated onto the magnetic signal by encoding the bit stream into the magnetic signal, where each bit in the bit stream is represented by a transition between adjoining data symbols formed of K repetitions of of a first state or a second state. The first state of the pair of states includes M/2 cycles of the nominal frequency with a signal at the high frequency and M/2 cycles of the nominal frequency with a signal at the low frequency. The second state is complementary to the first state.

48 Claims, 14 Drawing Sheets

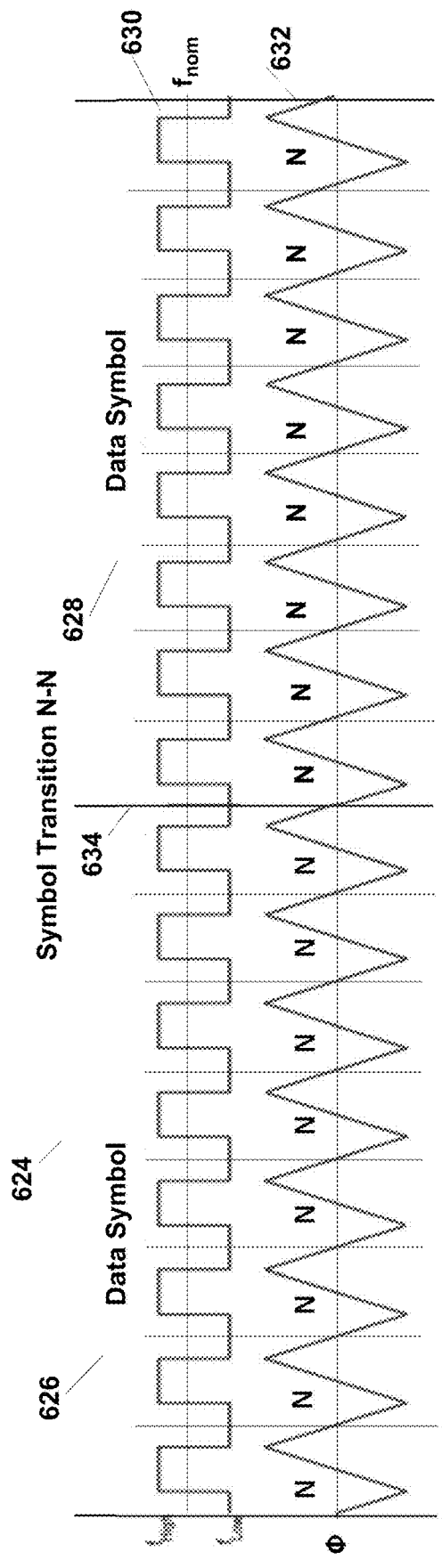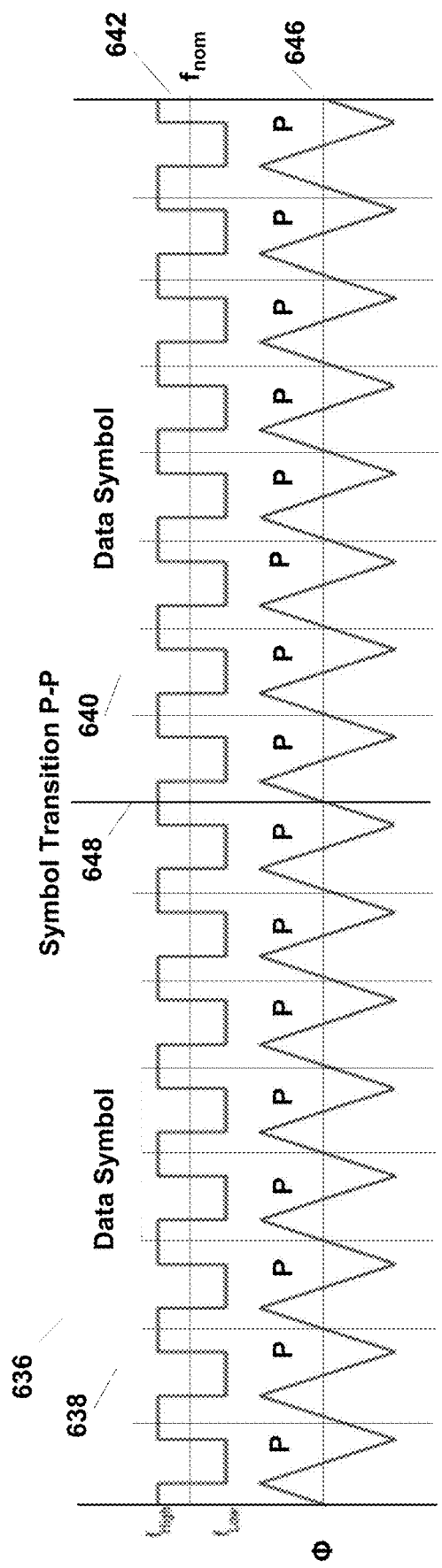
FIG. 6C
FIG. 6D

1020

1040

DATA ENCODING IN A LOW FREQUENCY MAGNETIC FIELD

CROSS-REFERENCE(S)

The present disclosure is related to co-pending and commonly-owned U.S. nonprovisional application Ser. No. 18/419,250, filed on the same day, Jan. 22, 2024, which is herein incorporated by reference in its entirety.

BACKGROUND

1. Technical Field

The current application is related to transmission of data on a low frequency magnetic field, for example transmission of data from a sonde to an above ground receiver on the magnetic field generated by the sonde.

2. Discussion of Related Art

Underground utility location and utility installation are common problems for utility companies and local municipalities. Several solutions have been developed to address these problems. In one case, where location of an underground cable or conducting pipeline is needed, an underground pipe and cable location system (often termed a line locator system) can be used. In that system, an above ground receiver detects magnetic signals transmitted by the underground pipe or cable in order to locate the pipe or cable. In another system, a sonde placed within a pipe or as part of a drilling rig can emit electromagnetic radiation that is detected by the above ground receiver to locate the position of the sonde. In some cases, markers can be located proximate the utility and are then used to locate the utility. The current disclosure is directed towards operations that involve locating an underground sonde, which for example is located in a pipe or included in a drill string.

Utility Locators comprising a signal source (Transmitter or Sonde) and a remote locator (Receiver) are well known and used within industry sectors who manage buried assets. The principle of emitting an electromagnetic field from a sonde and then locating the sonde with an above-ground receiver is well used. In the simplest applications the sonde emits sinewave signals that allow phase sensitive measurement of the resulting magnetic fields with the receiver. Receivers engaged in sonde location often include an array of spaced apart antennas (typically between 2 and 6 antennas) and can use the principles of phase coherence to derive directional and distance information to the sonde by correlating the measured signals and their relative phases.

Superimposing a low frequency data stream on to a sinewave carrier has some useful and additional applications for a locating system. In particular status information from the sonde can be communicated to the receiver. However, there are significant problems with the magnitude and phase of a dipole-shaped low frequency magnetic field, which can be emitted by the sonde, that can be provide degradation in the location measurement and further provides problems for transmission of digital data using the low frequency magnetic field.

Consequently, there is a need for better digital data communications between an underground sonde and an aboveground receiver.

SUMMARY

In accordance with embodiments of the present disclosure, a method of transmitting digital data from a sonde is presented. The method includes determining data to be transmitted; generating a bit stream based on the data to be transmitted; and transmitting a magnetic signal that is modulated with the bit stream, the magnetic signal having a nominal frequency and being formed of a first signal having a high frequency and a second signal having a low frequency, the high frequency being higher than the nominal frequency and the low frequency being lower than the nominal frequency, the nominal frequency being the average frequency of the magnetic signal, wherein the bit stream is modulated onto the magnetic signal by encoding the bit stream into the magnetic signal, where each bit in the bit stream is represented by a transition between adjoining data symbols, each of the data symbols is formed of K repetitions of one of a first state or a second state, where the first state of the pair of states includes M/2 cycles of the nominal frequency with a signal at the high frequency and M/2 cycles of the nominal frequency with a signal at the low frequency, and where a second state of the pair of states includes signals complementary to the first state.

In some embodiments, transitions representing a digital one bit is encoded with a first data symbol of the adjoining symbols formed with the first state and a second data symbol of the adjoining symbols formed with the first state or the first data symbol formed with the second state and the second data symbol formed with the second state.

In some embodiments, transitions representing a digital zero bit is encoded with the first data symbol formed with the first state and the second data symbol formed with the second state or the first data symbol formed with the second state and the second data symbol formed with the first state.

In some embodiments, the bit stream is formed into a continuous sequence of data frames, each data frame being formed with a separator followed by a synchronization field and one or more data fields, the synchronization field and the one or more data fields separated by a separator. In some embodiments, the separator bits are zero and the synchronization bits are all ones. In some embodiments, the frame further includes a cyclic redundancy check (CRC) field separated from the last data field by a separator.

In some embodiments, the method further includes reading pitch and roll data from the sonde and encoding the pitch and roll data into the one or more data fields. In some embodiments, the one or more data fields includes a first data field, a second data field, and a third data field. In some embodiments, pitch data is presented in the first data field and the second data field while roll data is presented in the third data field.

In some embodiments, the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

In accordance with some embodiments, a method of transmitting data from a sonde is presented. The method includes measuring parameters associated with the sonde with sensors in the sonde; encoding the parameters into a data frame, the data frame having a sequence of bits, the data frame including a separator followed by a synchronization field and one or more data fields separated by separators; determining a sequence of data symbols to represent the data frame, each of the sequence of bits in the data frame being represented by transitions between adjacent data symbols in the sequence of data symbols, the data symbols each being formed by K repetitions of a first state or formed by K repetitions of a second state, where the first state includes M/2 cycles of a nominal frequency with a high frequency signal at a high frequency and M/2 cycles of the nominal frequency with a low frequency signal at a low frequency, the high frequency being higher than the nominal frequency and the low frequency being lower than the nominal frequency such that the average signal is at the nominal frequency; and transmitting a magnetic signal formed from the sequency of data symbols.

In some embodiments, transitions representing a digital one bit is encoded with a first data symbol of the adjoining symbols formed with the first state and a second data symbol of the adjoining symbols formed with the first state or the first data symbol formed with the second state and the second data symbol formed with the second state. In some embodiments, transitions representing a digital zero bit is encoded with the first data symbol formed with the first state and the second data symbol formed with the second state or the first data symbol formed with the second state and the second data symbol formed with the first state. In some embodiments, the bit stream is formed into a continuous sequence of data frames, each data frame being formed with a separator followed by a synchronization field and one or more data fields, the synchronization field and the one or more data fields separated by a separator. In some embodiments, the frame further includes a cyclic redundancy check (CRC) field separated from the last data field by a separator. In some embodiments, the separator bits are zero and the synchronization bits are all ones In some embodiments, the method includes reading pitch and roll data from the sonde and encoding the pitch and roll data into the one or more data fields. In some embodiments, the one or more data fields includes a first data field, a second data field, and a third data field. In some embodiments, pitch data is presented in the first data field and the second data field while roll data is presented in the third data field.

In some embodiments, the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

In some embodiments of the present disclosure a sonde is presented. The sonde includes one or more sensors to measure parameters associated with the sonde; an antenna configured to transmit a magnetic signal; a driver coupled to drive the antenna to transmit a magnetic signal according to input signals; and a processor coupled to the one or more sensors and the driver, the processor configured to receive parameters associated with the sonde from the one or more sensors; encode the parameters into a data frame, the data frame having a sequence of bits, the data frame including a separator followed by a synchronization field and one or more data fields separated by separators; determine a sequence of data symbols to represent the data frame, each of the sequence of bits in the data frame being represented by transitions between adjacent data symbols in the sequence of data symbols, the data symbols each being formed by K repetitions of a first state or formed by K repetitions of a second state, where the first state includes M/2 cycles of a nominal frequency with a high frequency signal at a high frequency and M/2 cycles of the nominal frequency with a low frequency signal at a low frequency, the high frequency being higher than the nominal frequency and the low frequency being lower than the nominal frequency such that the average signal is at the nominal frequency; and communicate the input signal corresponding to the sequence of data symbols to the driver. In some embodiments, the parameters include roll and pitch data.

In some embodiments, the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

In some embodiments of the present disclosure, a method of receiving digital data from a magnetic signal transmitted by a sonde is presented. The method includes receiving a magnetic signal transmitted by the sonde, the magnetic signal having a nominal frequency and being formed of a first signal having a high frequency and a second signal having a low frequency, the high frequency being higher than the nominal frequency and the low frequency being lower than the nominal frequency, the nominal frequency being the average frequency of the magnetic signal; digitizing the magnetic signal to provide a digitized magnetic signal; and processing the digitized magnetic signal to recover a bit stream, where each bit in the bit stream is represented by a transition between adjoining data symbols, each of the data symbols is formed of K repetitions of one of a first state or a second state, where the first state of the pair of states includes M/2 cycles of the nominal frequency with a signal at the high frequency and M/2 cycles of the nominal frequency with a signal at the low frequency, and where a second state of the pair of states includes signals complementary to the first state.

In some embodiments, processing the digitized magnetic signal to recover the bit stream includes demodulating the magnetic signal to determine phase relative to a nominal signal, the nominal signal being at the nominal frequency; determining a sequence of data symbols; and determining the transitions between adjacent data symbols to determine the bit stream.

In some embodiments, demodulating the magnetic signal includes mixing the digitized magnetic signal with a sine and a cosine wave at a carrier frequency to obtain an in-phase and a quadrature signal; filtering the in-phase and the quadrature signal with decimator filters; mixing output signals from the decimator filters with the in-phase and quadrature signals to generate sub-carrier channel signals BX[I] and BX[Q]; combining the sub-carrier signals BX[I] and BX[Q] to form a cross product signal; mixing the cross product signal with a sine and cosine signal at a subcarrier frequency; filtering signals from the from the cross-product with a decimating filter to provide demodulated signals; and generating demodulated magnitude and phase signals from the demodulated signals. In some embodiments, the method further includes combining the sub-carrier channel signals BX[I] and BX[Q] from a plurality of magnetic signals before combining to form the cross product signal.

In some embodiments, receiving the magnetic signal includes receiving magnetic signals from a triaxial antenna, the triaxial antenna producing signals related to the magnetic field in two orthogonal horizontal directions and a vertical direction, and wherein combining the sub-carrier channel signals includes generating sub-carrier channel signals for each of the signals; and combining the sub-carrier channel signals for each of the signals to generate the combined sub-carrier channel signals.

In some embodiments, transitions representing a digital one bit is encoded with a first data symbol of the adjoining symbols formed with the first state and a second data symbol of the adjoining symbols formed with the first state or the first data symbol formed with the second state and the second data symbol formed with the second state.

In some embodiments, transitions representing a digital zero bit is encoded with the first data symbol formed with the first state and the second data symbol formed with the second state or the first data symbol formed with the second state and the second data symbol formed with the first state.

In some embodiments, the bit stream is formed into a continuous sequence of data frames, each data frame being formed with a separator followed by a synchronization field and one or more data fields, the synchronization field and the one or more data fields each separated by a separator. In some embodiments, the separator is a zero bit and the synchronization field includes all ones. IN some embodiments, the frame further includes a cyclic redundancy check (CRC) field separated from the last data field by a separator.

In some embodiments, the one or more data fields include a first data field, a second data field, and a third data field. In some embodiments, pitch data is presented in the first data field and the second data field while roll data is presented in the third data field.

In some embodiments, the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

In accordance with some embodiments of the present disclosure, a receiver is presented. In some embodiments, the receiver includes one or more antennas, each of the one or more antennas producing one or more signals related to a magnetic signal generated by a sonde; an analog front end that receives and digitizes each of the one or more signals from each of the one or more antennas; and a digital processor configured to receive the digitized signals from the analog front end and recovering digital data modulated onto the magnetic field generated by the sonde, wherein the magnetic signal is modulated according to a bit stream, the magnetic signal having a nominal frequency and being formed of a first signal having a high frequency and a second signal having a low frequency, the high frequency being higher than the nominal frequency and the low frequency being lower than the nominal frequency, the nominal frequency being the average frequency of the magnetic signal, and wherein the bit stream is modulated onto the magnetic signal by encoding the bit stream into the magnetic signal, where each bit in the bit stream is represented by a transition between adjoining data symbols, each of the data symbols is formed of K repetitions of one of a first state or a second state, where the first state of the pair of states includes M/2 cycles of the nominal frequency with a signal at the high frequency and M/2 cycles of the nominal frequency with a signal at the low frequency, and where a second state of the pair of states includes signals complementary to the first state.

In some embodiments, the digital processor is configured to identify transitions representing a digital one bit that is encoded with a first data symbol of the adjoining symbols formed with the first state and a second data symbol of the adjoining symbols formed with the first state or the first data symbol formed with the second state and the second data symbol formed with the second state. In some embodiments, the digital processor is configured to identify transitions representing a digital zero bit that is encoded with the first data symbol formed with the first state and the second data symbol formed with the second state or the first data symbol formed with the second state and the second data symbol formed with the first state.

In some embodiments, the bit stream is formed into a continuous sequence of data frames, each data frame being formed with a separator followed by a synchronization field and one or more data fields, the synchronization field and the one or more data fields separated by a separator. In some embodiments, the separator bits are zero and the synchronization bits are all ones. In some embodiments, the frame further includes a cyclic redundancy check (CRC) field separated from the last data field by a separator.

In some embodiments, the processor further includes reading pitch and roll data from the sonde and encoding the pitch and roll data into the one or more data fields. In some embodiments, the one or more data fields include a first data field, a second data field, and a third data field. In some embodiments, the digital processor is configured to recover pitch data that is presented in the first data field and the second data field and roll data that is presented in the third data field.

In some embodiments, the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

In some embodiments, the digital processor recovers digital data based on a single signal from one of the antennas. In some embodiments, one of the antennas is a triaxial antenna and the digital processor is configured to recover digital data based on three signals from the triaxial antenna.

These and other embodiments will be described in further detail below with respect to the following figures.

BRIEF DESCRIPTION OF THE DRAWINGS

FIGS. 6A, 6B, 6C, and 6D illustrates transitions between data symbols to encode data bits according to some aspects of the present disclosure.

Figure 1A:
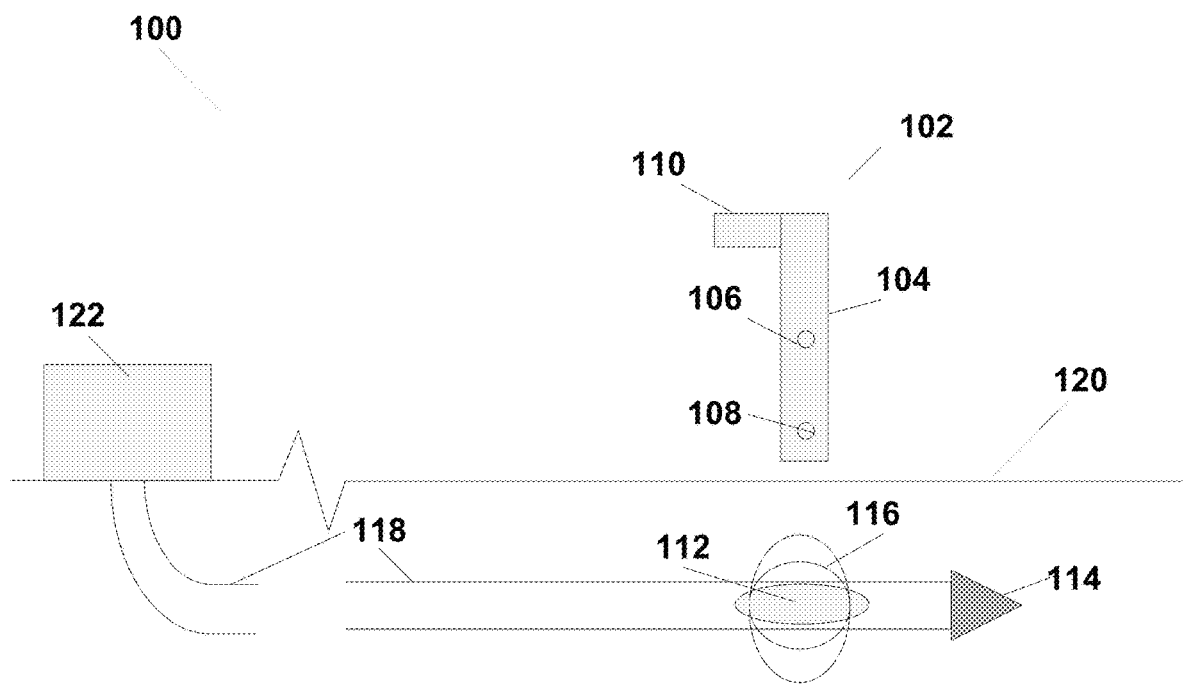
FIG. 1A illustrates an underground sonde interacting with an above ground receiver according to some aspects of the present disclosure.

The drawings may be better understood by reading the following detailed description.

DETAILED DESCRIPTION

In the following description, specific details are set forth describing some aspects of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. Such modifications may include substitution of known equivalents for any aspect of the disclosure in order to achieve the same result in substantially the same way.

Consequently, this description illustrates inventive aspects and embodiments that should not be taken as limiting—the claims define the protected invention. Various changes may be made without departing from scope of this description and the claims. In some instances, well-known structures and techniques have not been shown or described in detail in order not to obscure the invention.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Further, individual values provided for particular components are for example only and are not considered to be limiting. Specific dimensional values for various components are there to provide a specific example only and one skilled in the art will recognize that the aspects of this disclosure can be provided with any dimensions. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Embodiments of the present disclosure include a novel method of encoding and decoding digital information onto a low frequency alternating magnetic field, such as that transmitted by an underground sonde. Embodiments of this disclosure offer advantages over existing encoding and decoding methods and can be extended to include 3D orthogonal axis sensors. Embodiments of the present disclosure have applications for a sonde signal used in Horizontal Directional Drilling and Push Rod Boring systems. Other applications exist in the field of general pipe and cable locating, such as is described in U.S. Application Ser. No. 18/419,250, which is concurrently filed with the present application and is herein incorporated by reference in its entirety.

Embodiments of data encoding according to the present disclosure has multiple advantages over existing encoding and decoding methods and can be implemented on any antenna system or antenna array, including arrays with one or more 3D orthogonal axis sensors. Embodiments of sonde locating system including this encoding system are described below. Some embodiments of this disclosure provide real-time 'on-the-fly' data rather than separated data and command modes.

Embodiments of the present disclosure include a data coding scheme with an identified signal modulation that does not affect the locate field shape. The scheme is described in the context of a Sonde communicating pitch and roll information for a directional boring application using any antenna configuration, but the general idea, as a low bandwidth data mechanism applies equally to other applications.

Installing underground utility cable or pipe using a steerable boring tool is well known. The so called trenchless Horizontal Directional Drilling (HDD) system has the obvious advantage of being less disruptive on the surface, as compared to traditional excavation techniques. Significant developments in the art have facilitated accurate positional feedback so that operators can direct and control the drilling or boring operation. The method is not confined to drilling as some systems use push rods forced by hydraulic actuators to direct the drill string and head underground.

In each of these cases, accurate location of the drill head is desired in order to direct the drill head along the desired route for the cable or pipe being installed. One technique to provide positional feedback is to place a sonde in the drilling or boring head. The sonde then emanates a low frequency alternating magnetic field, which is typically a dipole field in shape. The location of the sonde can then be determined using an above-ground receiver to detect the low frequency alternating magnetic field. An illustration of an example of this system is illustrated in FIG. 1A.

Figure 1B:
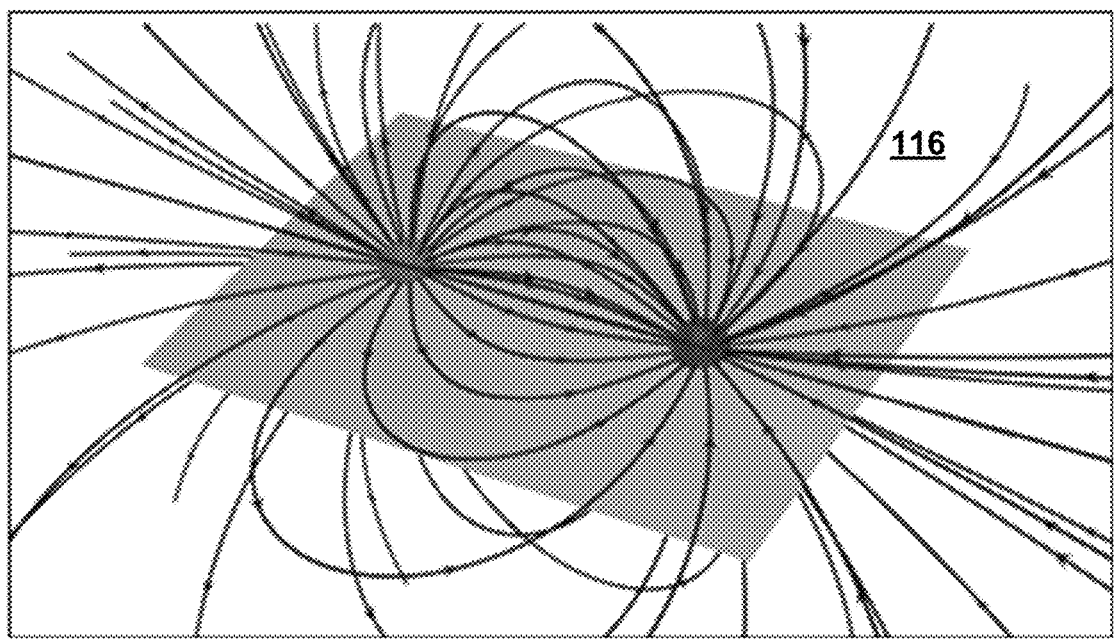
FIG. 1B illustrates a dipole magnetic field that can be emitted by a sonde as illustrated in FIG. 1A.

FIG. 1A illustrates a boring system 100 that uses a sonde 112 in positioned proximate to the drill head 114. As illustrated in FIG. 1A, drill head 114 is attached to a drill string 118. Sonde 112 is located in the drill string 118 adjacent to drill head 114, or in drill head 114 itself. Drill head 114 and sonde 112 are underground, under surface 120 as illustrated in FIG. 1A. As is illustrated, Sonde 112 emits an electromagnetic field 116, which as discussed above can be a low-frequency dipole magnetic field. FIG. 1B further illustrates a dipole field 116, which can be generated with a dipole antenna within sonde 112.

Receiver 102 is locating above surface 120 and usually can be handheld by an operator. Typically, receiver 102 includes a wand 104 where one or more antennas are positioned. Antennas in this antenna array can be spaced apart in both horizontal and vertical configurations in order to map the magnetic field. In the example of FIG. 1A, antennas 106 and 108 are positioned within wand 104. Antennas 106 and 108 can each be 3-D antennas (also referred to as triaxial antennas), but combinations of 2-D antennas and 1-D antennas can be used. A 3-D antenna, or triaxial antenna, can include three individual coils that are positioned relative to one another to measure magnetic fields in three orthogonal directions at a point at the center of the antenna. Signals from antennas 106 and 108 can be processed within receiver 102 and the results displayed on a user interface 110.

In some examples, the results can include the determination of the position of sonde 112. This positional data can be transmitted to the drill controller 122 that controls drill string 118 and drill head 114. The drill controller 122 can steer drill head 114 based on the positional data received from receiver 102. In some embodiments, receiver 102 and controller 122 can be in communication so that controller 122 can receive accurate data regarding the position of sonde 112.

Figure 2A:
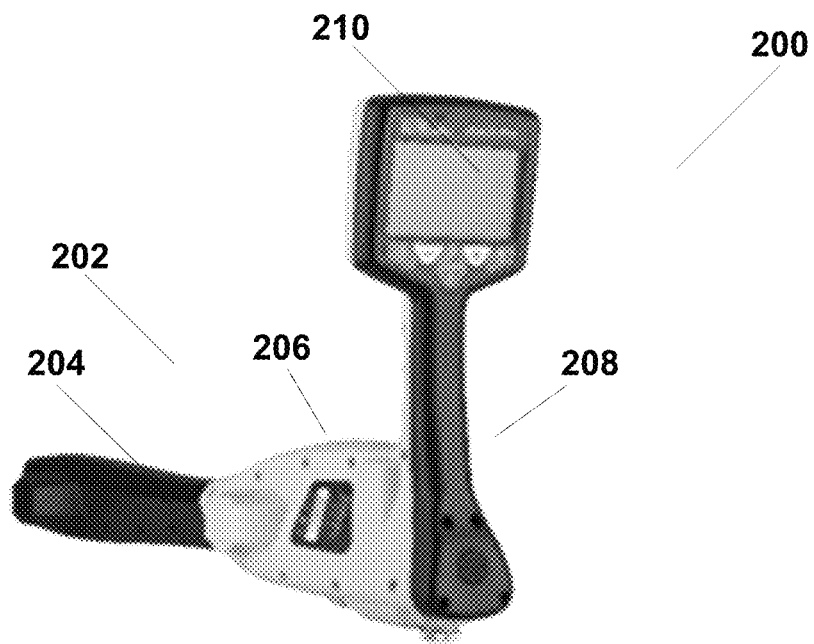
FIGS. 2A and 2B illustrate a hand-held receiver unit and a user interface, respectively, that can be used to locate an underground sonde and receive data from the underground sonde according to some aspects of the present disclosure.
Figure 2B:
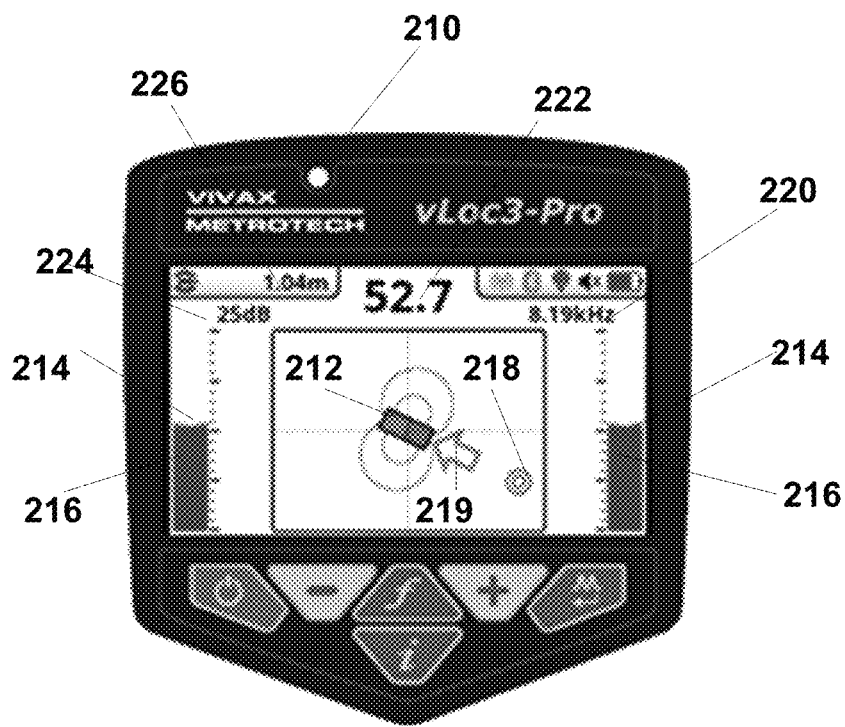

FIGS. 2A and 2B illustrate an example of a receiver 200, that can be an example of receiver 102 as illustrated in FIG. 1A. As shown in FIG. 2A, receiver 200 includes a wand 202. Wand 202 includes an antenna section 204 and an electronics section 206. Electronics section 206 can include digital circuitry, microprocessors, ASICs, memory, filters, A/D converters, and all other electronics that process the signals received from antennas housed in antenna section 204. The antennas distributed within antenna section 204, as discussed above, can be antennas any combination of 3-D, 2-D, and 1-D antennas spaced relative to each other in a direction along the length of wand 202 and in a direction perpendicular to wand 202 to provide both vertical and horizontal data to electronics section 206.

Receiver 200 includes a handle section 208 and a user interface 210. Handle section 208 is connected between wand 202 and user interface 210. User interface 210 displays the results of the data processing performed in electronics section 206 of wand 202.

FIG. 2B illustrate an example of user interface 210. For demonstrative purposes, the user interface of a Vloc3-Pro receiver (produced by Vivax Metrotech Corp.) in Sonde mode. However, receiver 200 can be adapted to operate according to aspects of the present disclosure.

As illustrated in FIG. 2B, user interface 210 displays a peak signal detector 214, a signal strength bar graph 216, a sonde icon 212, a null point 218, a directional arrow 219 that indicates the direction to the detected sonde, a frequency selection 220, a numeric signal level 222, and a gain setting 224. The numeric signal level 222 mirrors the signal strength bar graph 216. As is understood from the electromagnetic field pattern around a sonde, there are two null points ahead and behind the sonde (one of which is indicated by null point 218) and the sonde is located at a maximum of the field strength. In some embodiments, sonde 112 can emit electromagnetic fields at a frequency selected from a number of different frequencies (or tones). The locator 200 is tuned to the frequency that the sonde is locating. Consequently, using the data displayed on user interface 210 an operator can, once the electromagnetic field from the sonde is detected, locate the point above the surface under which the sonde is located. Given the signal strength and other characteristics, the depth of the sonde can also be determined.

Consequently, the system that includes receiver 200 gives a clear graphical representation of the position of a Sonde 112 relative to receiver 200 in a locating system 100 as illustrated in FIG. 1A. As shown in FIG. 2B, receiver 200 can also calculate and show the depth 226 of the Sonde 112 and a strength indicator 222 of the signal strength received. The receiver can use two sets of tri-axial antennas located in antenna portion 204 to give an omni locate bar-graph and without the 'nulls' which cause confusion in locating instruments equipped with only four (4) sensors. The guidance arrow(s) 219 lead to the target sonde 112 on a path that automatically aligns the user on the axis of the sonde 112. The sonde icon 212 indicates the sonde position and field alignment. The Null positions (intrinsic to the dipole field) are indicated by the null point 218. In this system the sonde can be in any orientation, even vertical.

As discussed above, existing Horizontal Boring applications make use of the data transmitted by the Sonde to provide feedback to an operator, which allows the operator to steer the drill along the required path. The drill head direction can be controlled by controlling the pitch angle and roll angle of the drilling head 114. The pitch angle is the angle that the drilling or cutting head axis makes with respect to a level surface perpendicular to the direction of gravity. The roll angle is the rotation angle of the drilling or cutting head about its axis with respect to the direction of gravity.

The axis of sonde 112 can be the same as that of drilling head 114. Consequently, the pitch and roll of the sonde can be the same as that of the drilling head 114. Consequently, pitch and roll may be among the data that would be useful to transmit from sonde 112 to receiver 102, e.g. receiver 200.

Whilst many encoding and decoding systems can convey digital information on a suitable carrier, there are consequential problems to the magnitude and phase of a low frequency magnetic field. These problems cause degradation of the primary purpose of a locating instrument—accurate pin-point locating and depth measurement. In particular, traditional Amplitude Modulated Manchester Bi-Phase encoding has a detrimental effect on the ability to locate sonde 112 with receiver 200.

Conventional data transmission between the sonde and the transmitter may result in multiple difficulties. The dipole magnetic field which emanates from a Sonde as illustrated in FIG. 1B is a well-known shape. The field geometry illustrated in FIG. 1B causes problems when the electromagnetic field emitted by the sonde is processed by a 3D sensor array of the receiver, which provides a response according to three (3) orthogonal axes. In particular, there are points where one or more sensors may experience a null and a phase reversal, which causes difficulty in retrieving digital data. Movement of the locator causes individual sensors to rotate and translate their relative position in the magnetic field and this can lead to multiple phase reversals being encountered. Given these problems, there is a need for a data encoding and decoding system which can overcome these issues, without causing a discontinuity to the user interface or indeed to the decoded data.

Consequently, there are identified needs for improvement. Embodiments of the present disclosure address one or more of these needs. Some embodiments of the present disclosure may provide a waveform and data encoding system that runs in continuous wave, without the need to separate a data mode from a general locating mode. Some embodiments of the present disclosure may provide a waveform and data encoding scheme that allows data decoding even when a phase discontinuity or phase reversal on one or more of the orthogonal sensors occurs. Some embodiments of the present disclosure may provide a waveform and data encoding scheme that avoids a drift of the average frequency of the carrier. Some embodiments of the present disclosure may provide a waveform and data encoding scheme that can be phase and/or frequency tracked such that the encoded data waveform does not cause a net phase or frequency drift. Some embodiments of the present disclosure may provide a waveform and data encoding scheme that is balanced over a cycle of the sub-carrier. Some embodiments may of the present disclosure provide a waveform and data encoding scheme that guarantees phase coherence between the transmitter and receiver. Some embodiments of the present disclosure may provide a waveform and data encoding scheme which ensures there is negligible loss of signal-to-noise ratio when compared with a pure sinewave transmission. Some embodiments of the present disclosure may provide a waveform and data encoding scheme which does not impose periodic step response (Heaviside Step Function) on the Digital Signal Processing and associated filter history.

The signal tone is modulated as discussed below so that sonde 118 can also transmit digital information to receiver 200. In embodiments of the present disclosure, the modulation is implemented in such a way that there is practically no disturbance to the signal locating tone, and therefore does not interfere with the ability of receiver 200 to locate sonde 118. Further, since the modulation is provided on the signal locating tone (as a frequency shift key (FSK) based around the signal locating tone), each of the antennas in antenna section 202 provides a signal that includes the modulation. Signals from one or more of the antennas in antenna section 202 can be used to demodulate the modulated signal and recover the transmitted data.

Figure 3A:
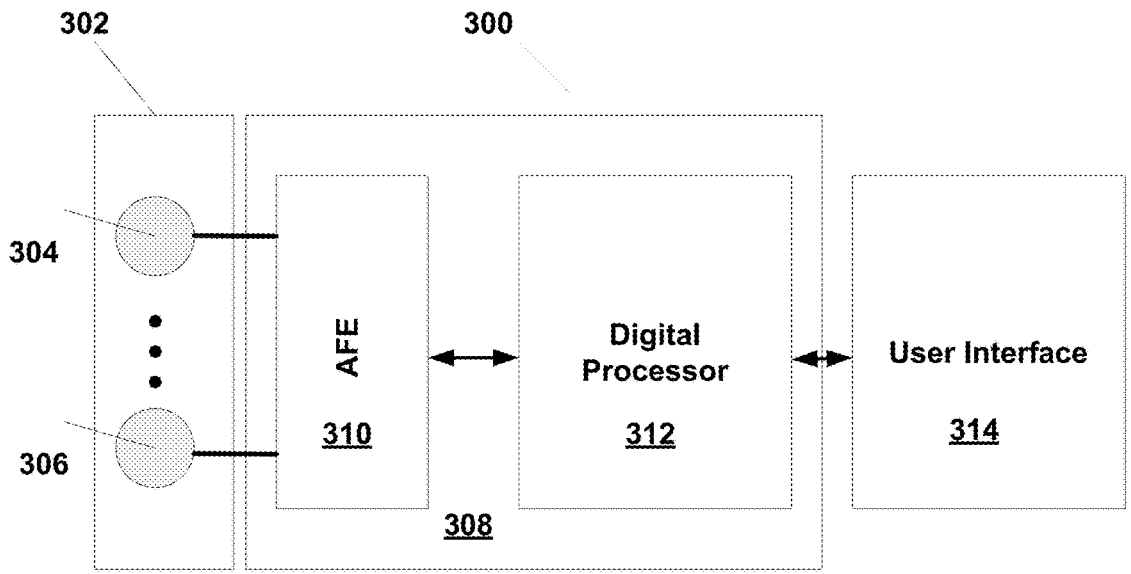
FIGS. 3A and 3B illustrate a block diagram of a hand-held receiver according to some aspects of the present disclosure.
Figure 3B:
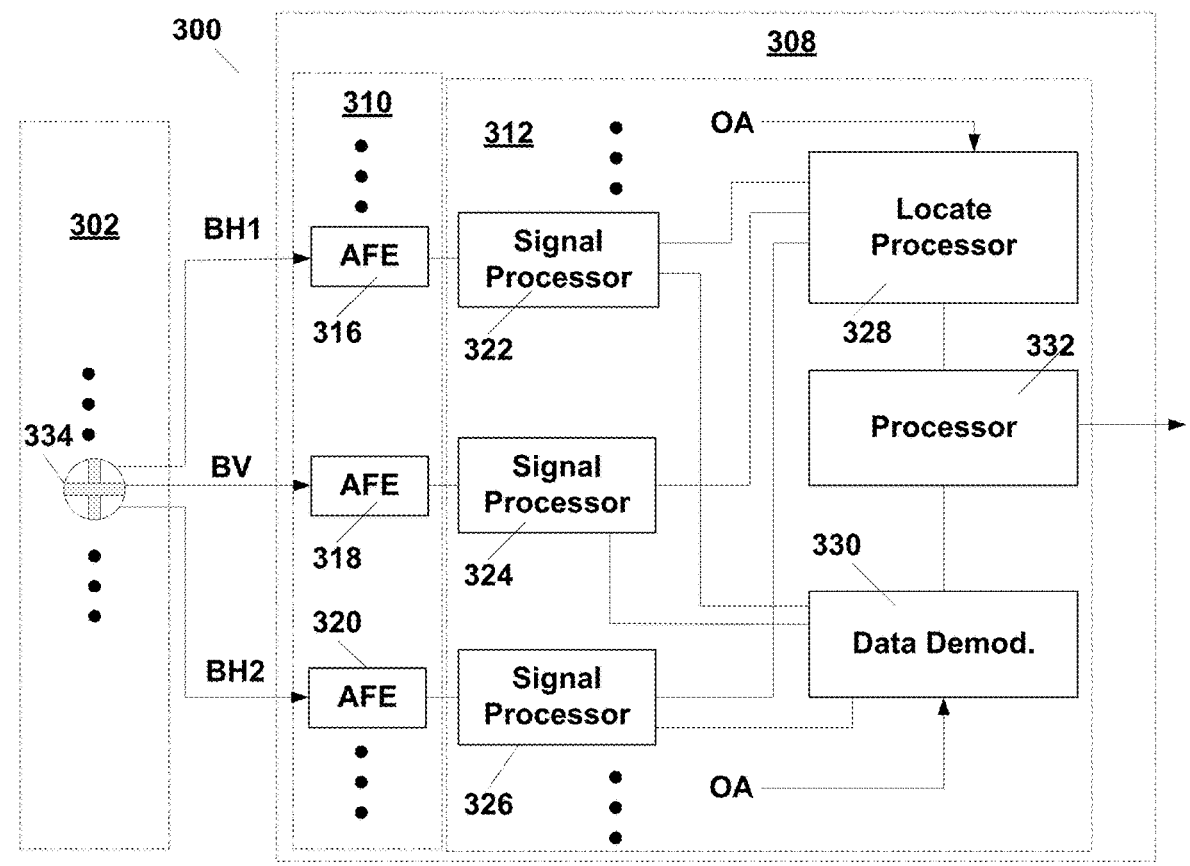
Figure 3C:
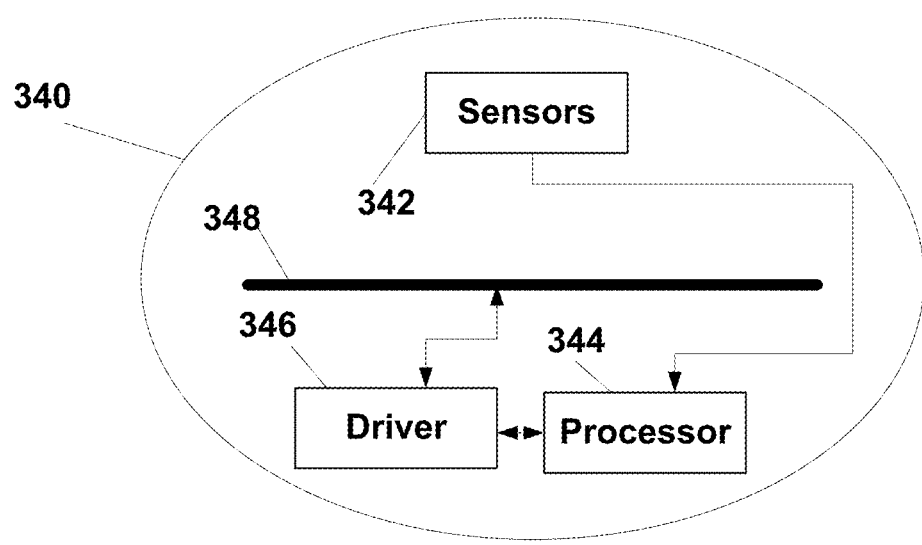
FIG. 3C illustrates a block diagram of a sonde according to some aspects of the present disclosure.

FIGS. 3A and 3B illustrate a receiver 300 and FIG. 3C illustrates a sonde 340 according to some embodiments of the present disclosure. As shown in FIG. 3C, sonde 340 can includes sensors 342 that provide data to processor 344. Sensors 340 can include pitch and roll sensors as well as other sensors, for example environmental sensors. Sensors 340 also includes analog processing and digitizing circuitry to provide digital data to processor 344. Processor 344 is coupled to a driver 346. Driver 346 provides a signal to drive a dipole antenna 348 to generate a dipole field as illustrated in FIG. 1B at a particular frequency, or tone, which is selected by processor 344. Processor 344 can be preset to generate fields of a particular frequency prior to deployment or can generate fields at a frequency that is communicated to sonde 340 in other ways. Processor 344 can also provide digital data to driver 346, which is modulated onto the tone generated by sonde 340 and transmitted via the dipole field from antenna 348. A modulation method according to embodiments of the present disclosure is further described below. Sonde 340 can replace sonde 112 in FIG. 1A.

In particular, processor 344 can include any combination of microprocessors, microcomputers, discrete digital circuitry, application specific integrated circuits (ASICs), volatile and non-volatile memory, or other components to perform as described here. In particular, processor 344 can receive measured parameters from the one or more sensors of sensors 342, compiles the parameters into a digital bit stream as described below, and provides input signals to driver 346 that controls magnetic signal transmitted by antenna 348.

FIG. 3A illustrates a receiver 300 according to some embodiments of the present disclosure. Receiver 300 according to embodiments of the present disclosure can locate and receive digital data from sonde 340 as illustrated in FIG. 3C. As illustrated in FIG. 3A, receiver 300 can include multiple antennas geometrically distributed within a wand 302. In the example illustrated in FIG. 3A, receiver 300 includes two antennas, antennas 304 and 306, although there may be any number of antennas of any type distributed within wand 302. In some embodiments, antennas 304 and 306 can each be triaxial antennas, each with multiple coils oriented to measure the magnetic field along each of three orthogonal axis. Antennas 304 and 306 detect the electromagnetic fields that are transmitted by sonde 340.

As is illustrated in FIG. 3A, signals from antennas 304 and 306 in wand 302 are input to electronics section 308. In particular, the signals from antennas 304 and 306 are input to an analog front end (AFE) 310 for analog processing. AFE 310 can receive signals transmitted by sonde 340, provide some analog filtering to the received signals, and digitize the signals with an analog-to-digital converter. A digital processing circuit 312 receives and processes the digitized signals as discussed in further detail below. In particular, digital processing circuit 312 can be any combination of microprocessors, microcomputers, discrete digital circuitry, application specific integrated circuits (ASICs), volatile and non-volatile memory, or other components that perform the functions as described here. In particular, digital processing circuit 312 digitally process signals at the particular frequency of sonde 340 and further demodulates and receives digital data that is transmitted with the magnetic fields transmitted by sonde 340. Digital processing circuit 312 is coupled to user interface 314 to display locate information and sonde data to a user, and may transmit data to a controller of sonde 340. Receiver 300 can be similar to receiver 200 illustrated in FIG. 2A and user interface 314 can be similar to that displayed in FIG. 2B.

Sonde 340 and receiver 300 are configured such that sonde 340 is set to transmit an electromagnetic field according to a selected tone and receiver 300 is set to receive the electromagnetic field according to the selected tone. Further, sonde 340 and receiver 300 are configured to exchange data using the selected tone as is further described below.

In particular, sonde 340 generates an oscillating magnetic field in a narrow bandwidth that constitutes the signal tone. The signal tone allows sonde 340 to be located by a magnetic field locating device (locator) such as receiver 300, as discussed above. Sonde 340 may be programmed to operate on a plurality of selectable tones. Sonde 340 and receiver 300 are then tuned to the same tone so that receiver 300 can receive the electromagnetic field generated by sonde 340 and thereby locate sonde 340.

The signal tone is modulated as discussed below so that sonde 340 can also transmit digital information to receiver 300. In embodiments of the present disclosure, the modulation is implemented in such a way that there is practically no disturbance to the signal locating tone, and therefore does not interfere with the ability of receiver 300 to locate sonde 340.

FIG. 3B illustrates a more detailed example of receiver 300 according to some embodiments of the present disclosure. The example illustrated in FIG. 3B shows processing of signals from an example antenna 334, which is one of the antennas in wand 302. In this example, antenna 334 is a triaxial antenna formed from three concentric, orthogonal magnetic field coils to measure the magnetic field strength in three orthogonal directions. Consequently, antenna 334 produces three signals related to the magnetic field strengths in two orthogonal horizontal directions (BH1 and BH2) and the magnetic field strength in the vertical direction (BV). It should be noted that the terms "horizontal" and "vertical" relate to the physical positioning of receiver 300 and will correspond to geographic horizontal and vertical positions only if receiver 300 is physically oriented accordingly.

The signals BH1, BH2, and BV are input to AFE 310 in electronic section 308. As is illustrated, signal BH1 is input to AFE 316, BV is input to AFE 318, and BH2 is input to AFE 320. As discussed above, each of AFE 316, AFE 318, and AFE 320 provide analog filtering and digitization of the respective signals. The digital signals from AFE 316, 318, and 320 are input to signal processing 322, 324, and 326.

Signal processing 322, 324, and 326 process each of the digitized signals BH1, BV, and BH2, respectively, to recover signal magnitude and phase, which is input to locate processing 328. Locate processing 328 processes the magnitudes and phases of the magnetic field signals detected by 334, as well as the signals received from other antennas in wand 302, to determine the location of sonde 340 based on those signals. Signals from signal processing 322, 324, and 326 can also be input to data demodulator 330 where the digital data modulated onto the magnetic signals measured by antenna 334 is recovered. In some embodiments, data demodulator 330 recovers the digital data based on one of the signals BH1, BV, or BH2. In some embodiments, data demodulator 330 recovers the digital data based on a combination of all of the signals BH1, BV, and BH2. In some embodiments, data from multiple antennas in wand 302 can be used to recover the digital data.

As is discussed above, sonde 340 modulates data onto the generated electromagnetic field. As discussed in further detail below, in the implemented modulation according to the present disclosure, the frequency of the electromagnetic field generated by sonde 340 switches between two frequencies, $f_{High}$ and $f_{Low}$. The first frequency, $f_{High}$, is slightly above the nominal signal frequency $f_{nom}$ of the tone and the second frequency, $f_{Low}$, is slightly below the nominal signal frequency $f_{nom}$ of the tone. In accordance with aspects of the present disclosure, the average frequency $f_{avg}$ over time of the electromagnetic field generated by sonde 340 is $f_{nom}$.

The phase of the signal relative to the nominal signal tone thus ramps up during transmission of signals at $f_{High}$ and ramps down during transmission of frequencies at frequency $f_{Low}$. This ramping up and down can be used to construct a data sub-carrier, the phase of which encodes information as explained in more detail below. In this modulation scheme sub-carrier cycle can be composed of M signal tone cycles and can exist in one of two phase states, referred to as positive (P) and negative (N). In general, each of the two phase states includes M/2 signal tone cycles at frequency $f_{High}$ and M/2 signal tone cycles at frequency $f_{Low}$. The signals at $f_{High}$ and $f_{Low}$ can be distributed in any fashion through the M signal tone cycles and consequently the phase of the signal relative to the nominal signal is the same at the end of the M cycles as it was at the beginning of the M cycles, for example zero. The two phase states are complementary in that where, in the M cycles, the first phase is generating a signal at frequency $f_{High}$ the second phase is generating a signal at frequency $f_{Low}$, and where the first phase is generating a signal at frequency $f_{Low}$ the second phase is generating a signal at frequency $f_{High}$.

In some embodiments, for example, the P state consists of M/4 cycles at frequency $f_{High}$ followed by M/2 cycles at frequency $f_{Low}$ and then M/4 cycles at frequency $f_{High}$. It is thus convenient, but not essential, for M to be a multiple of 4. The N state consists of M/4 cycles at frequency $f_{Low}$ followed by M/2 cycles at frequency $f_{High}$ and then M/4 cycles at frequency $f_{Low}$. Note that the frequency cycles of $f_{high}$ and $f_{low}$ in the N state are transposed relative to the P state. This represents an example carrier scheme, but other carrier schemes can be devised such that the average frequency over the carrier scheme is the nominal frequency for the tone and the N-state and P-states of the carrier scheme are transposed.

Figure 4A:
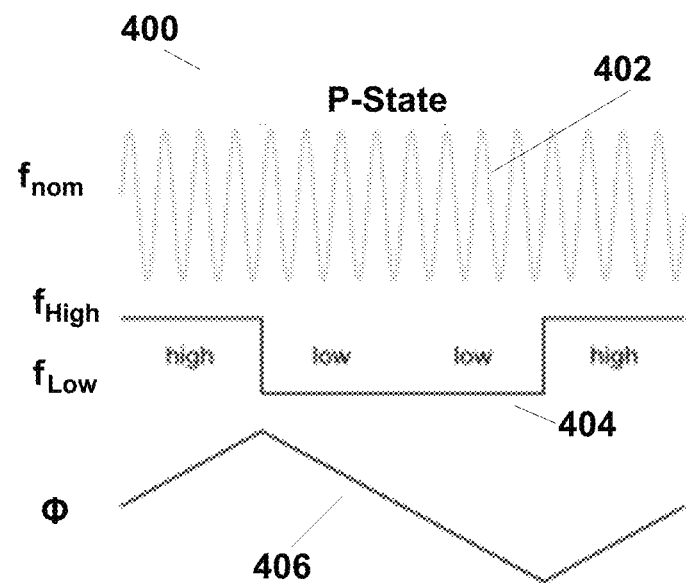
FIGS. 4A and 4B illustrate a subcarrier scheme according to some aspects of the present disclosure.
Figure 4B:
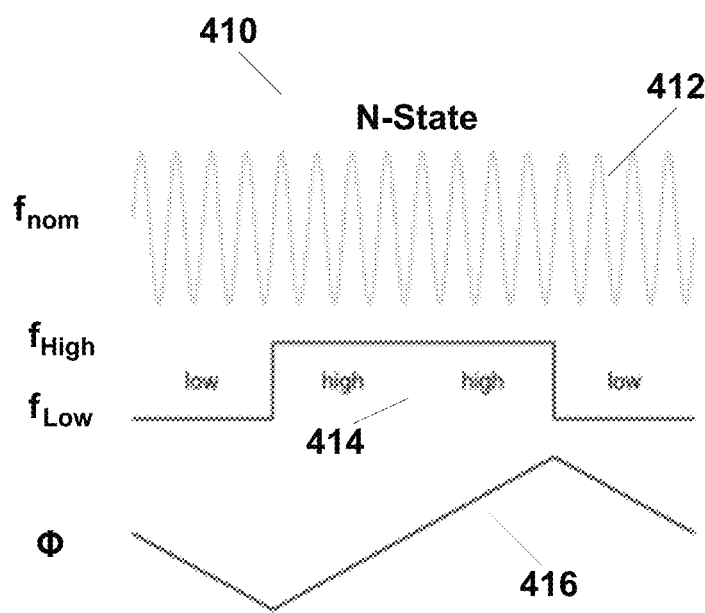

FIGS. 4A and 4B illustrate states P and N for a subcarrier scheme with M=16 cycles, as described above. As illustrated in FIG. 4A, a P-state 400 is illustrated. Nominal signal 402 with frequency $f_{nom}$ is illustrated for reference. The actual signal frequency 404 illustrates that, in P-state 400, there are four cycles (M/4) where the signal has frequency $f_{high}$, then eight cycles (M/2) where the signal has frequency $f_{low}$, and another four cycles (M/4) where the signal has frequency $f_{high}$. The phase (Φ) 406 of the actual signal relative to nominal signal 402 then illustrates that during cycles where the signal is operating at frequency $f_{high}$ the phase increases and during cycles where the signal is operating at frequency $f_{low}$ the phase decreases. As a consequence, during P-State 400 the phase reaches a peak after the first cycles with the signal at frequency $f_{high}$, a low after the cycles where the signal is at frequency $f_{low}$, and returns to the starting phase (which may be 0) after the second cycle with the signal at frequency $f_{high}$. Consequently, the distribution of cycles with $f_{High}$ and $f_{Low}$ is symmetric so that there is no overall change in the phase over the M cycles of the P-state subcarrier scheme.

FIG. 4B illustrate an N-state 410 according to some embodiments of this disclosure. Nominal signal 412 with frequency $f_{nom}$ is illustrated for reference. The actual signal frequency 414 illustrates that, in N-state 412, there are four cycles (M/4) where the signal has a frequency $f_{Low}$ followed by eight cycles (M/2) where the signal has a frequency $f_{High}$, again followed by four cycles (M/4) where the signal has a frequency $f_{Low}$. The phase (Φ) 416 of the signal relative to nominal signal 412 then illustrates that during cycles where the signal is operating at frequency $f_{Low}$ the phase decreases and during cycles where the signal is operating at a frequency $f_{High}$ the phase increases. As a consequence, during N-state 412 the phase reaches a minimum after the first cycles with the signal at frequency $f_{Low}$, a high after the cycles where the signals is at frequency $f_{High}$, and returns to the starting phase (which may be 0) after the final cycles with the signal at frequency $f_{Low}$. Consequently, the distribution of cycles with $f_{High}$ and $f_{Low}$ is symmetric so that there is no overall change in the phase over the M cycles of the subcarrier scheme.

It should be noted that the example illustrated in FIGS. 4A and 4B is for illustration only. The number of cycles M that can be used in the N-state and P-state can be any value. Further, there may be a different subcarrier scheme (i.e. different sequence of $f_{High}$ and $f_{Low}$ signals). The scheme can be expanded or modified to have different numbers of cycles or a different distribution of $f_{High}$ and $f_{Low}$. However, in accordance with embodiments of the present disclosure, the sequence of $f_{High}$ and $f_{Low}$ cycles are symmetric so that at the conclusion of the subcarrier scheme the change in phase throughout the M cycles of the scheme is zero (0). Furthermore, the average frequency of the signal is at $f_{nom}$ throughout transmission of data.

In accordance with some embodiments of the present disclosure, data symbols can be transmitted using a series of successive subcarrier schemes. In accordance with embodiments of the present disclosure, each transmitted data symbol can be indicated with an integer number K of identical sub-carrier cycles, that is either K cycles of P or K cycles of N. Consequently, in order to transmit data the signal tone frequency $f_{nom}$ is a factor of K*M higher than the data symbol rate (i.e. $f_{nom}=a*K*M$, where a is the data symbol rate).

Figure 5A:
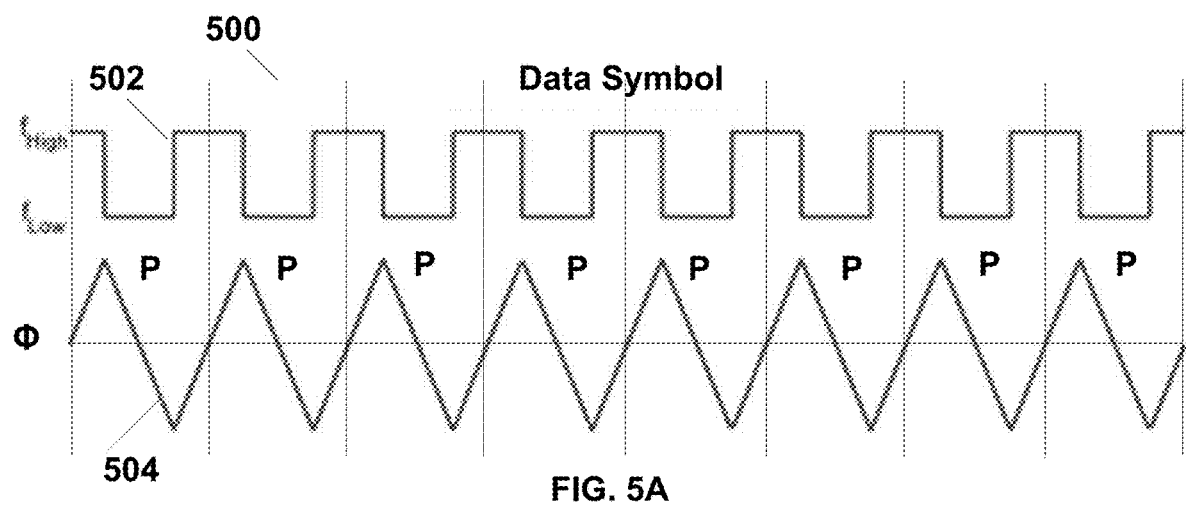
FIGS. 5A and 5B illustrate data symbols according to some aspects of the present disclosure.
Figure 5B:
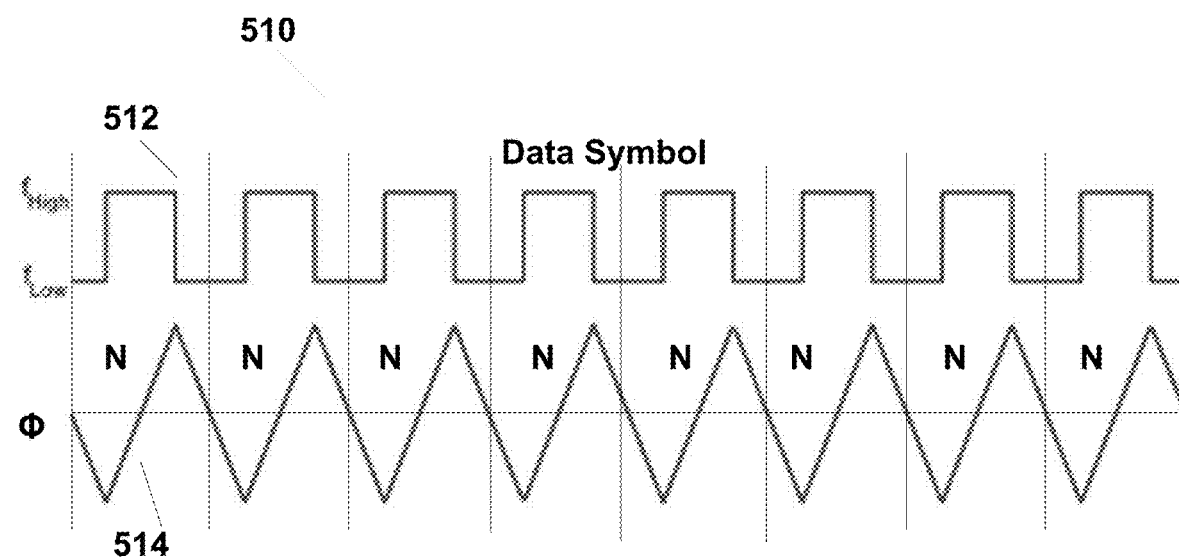

FIGS. 5A and 5B illustrate data symbols represented in K repetitions of P states or K repetitions of N states, respectively. In the example illustrated in FIGS. 5A and 5B, K is eight (8). For example, a first data symbol is formed from P states and a second data symbol can be formed of N states. In general, K can be any integer. FIG. 5A illustrates a data symbol 500. In particular, the symbol frequency 502 that includes K=8 P-states 400 as illustrated in FIG. 4A, for example. The phase change 504 indicates the phase change of the signal over the K*M cycles of the data symbol. As indicated, the phase change 504 is symmetric across the symbol 500 and results in no overall phase change (ΔΦ=0).

Similarly, FIG. 5B illustrates a data symbol 510 formed with K=8 N-states. The symbol frequency 502 includes K=8 N-states 410 as illustrated in FIG. 4B, for example. The phase change 514 indicates the phase change of the signal over the K*M cycles of the data symbol. As indicate, the phase change 514 is symmetric across data symbol 510 and results in no overall phase change (ΔΦ=0).

In accordance with embodiments of the present disclosure, individual data bits are transmitted at the symbol rate a based on the boundary between successive data symbols. In some embodiments, a zero bit can be represented by a phase transition between two successive data symbols (P-N or N-P) and a one bit is represented by no phase transition between successive data symbols (P-P or N-N). In other words:

0 (zero)=P-N or N-P transition between successive data symbols; and
1 (one)=P-P or N-N transition between successive data symbols.

Figure 6A:
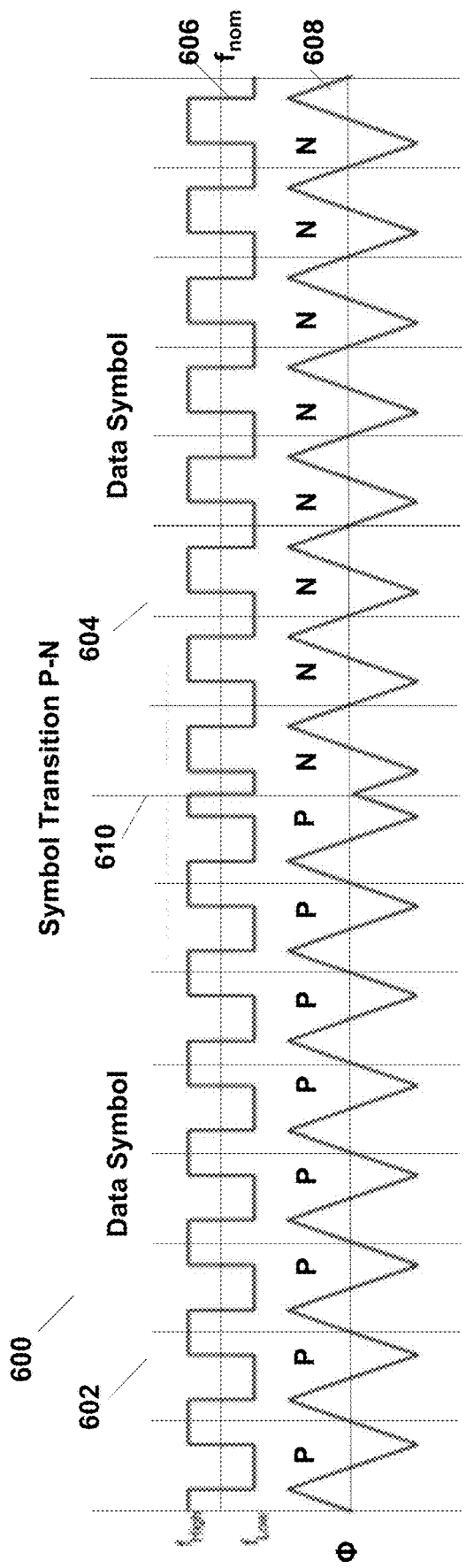

FIGS. 6A through 6D illustrate depictions of the various transitions used to represent digital bits according to some embodiments of the present disclosure. FIG. 6A illustrates a data symbol transition 600 from P-state symbols to N-state symbols, which as discussed above can represent a digital 0 bit. FIG. 6A illustrates two successive data symbols, symbols 602 and 604. Data symbol 602 is a data symbol 500 as shown in FIG. 5A, which includes K=8 number of successive P-states 400 as illustrated in FIG. 4A. Data symbol 604 is a data symbol 510 as shown in FIG. 5B, which includes K=8 number of successive N-states 410 as shown in FIG. 4B. FIG. 6A illustrates the frequency of the signal 606 ($f_{High}$ and $f_{Low}$) and the phase 608 relative to the nominal signal. Data symbol 602 ends and data symbol 604 begins at transition 610. As shown in FIG. 6A, data symbol 602 (that includes successive P-states) smoothly transitions to data symbol 604 (that includes successive N-states) at transition 610. As is illustrated, there are no discontinuities in phase 608. Further, there is no overall shift in phase 608 through the transition such that the phase at the start of data symbol 602 is the same as that at the end of data symbol 604 (i.e., ΔΦ=0).

Figure 6B:
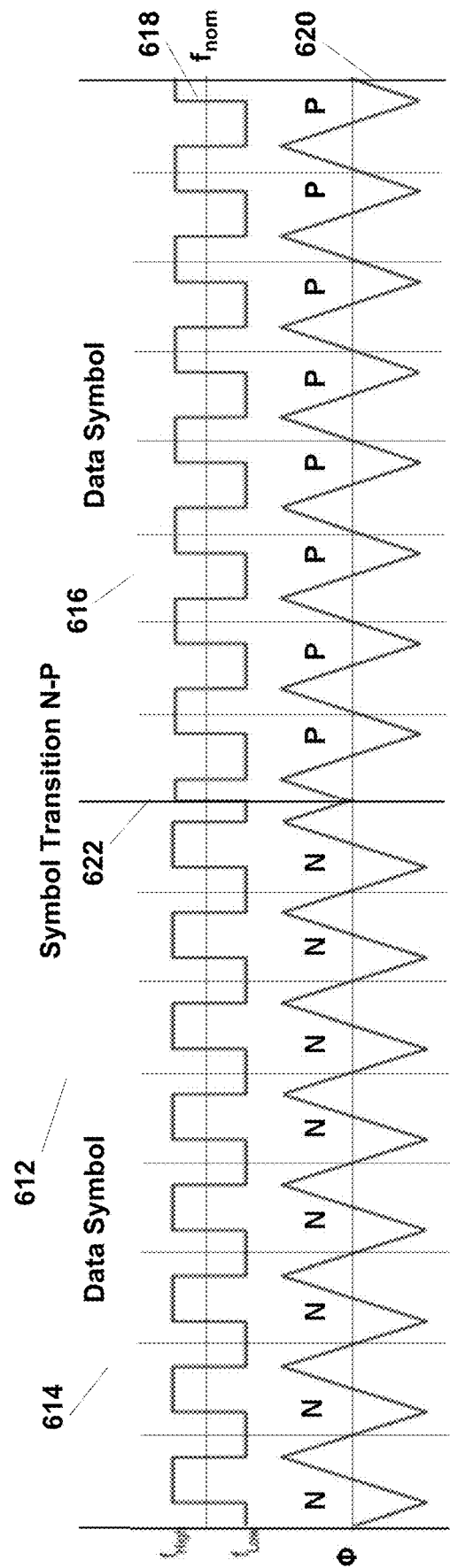

FIG. 6B illustrates a data symbol transition 612 from N-state symbols to P-state symbols, which as discussed above can represent a digital 0 bit. FIG. 6B illustrates two successive data symbols, symbols 614 and 616. Data symbol 614 is a data symbol 510 as shown in FIG. 5B, which includes K=8 number of successive N-states 410 as illustrated in FIG. 4B. Data symbol 616 is a data symbol 500 as shown in FIG. 5A, which includes K=8 number of successive P-states 400 as shown in FIG. 4A. FIG. 6B illustrates the frequency of the signal ($f_{High}$ and $f_{Low}$) 618 and the phase 620 relative to the nominal signal. Data symbol 614 ends and data symbol 616 begins at transition 622. As shown in FIG. 6B, data symbol 614 (that includes successive N-states) smoothly transitions to data symbol 616 (that includes successive P-states). As is illustrated, there are no discontinuities in phase 620. Further, there is no overall shift in phase 620 through the transition such that the phase at the start of data symbol 614 is the same as that at the end of data symbol 616 (i.e., ΔΦ=0).

FIG. 6C illustrates a data symbol transition 624 from N-state symbols to N-state symbols, which as discussed above can represent a digital 1 bit. FIG. 6C illustrates two successive data symbols, symbols 626 and 628. Both data symbol 626 and data symbol 628 are illustrated as data symbol 510 as shown in FIG. 5B, which includes K=8 number of successive N-states 410 as shown in FIG. 4B. FIG. 6C illustrates the frequency of the signal ($f_{High}$ and $f_{Low}$) 630 and the phase 632 relative to the nominal signal. Data symbol 626 ends and data symbol 628 begins at transition 634. As shown in FIG. 6C, data symbol 626 (that includes successive N-states) smoothly transitions to data symbol 628 (that also includes successive N-states). As is illustrated, there are no discontinuities in phase 632. Further, there is no overall shift in phase 632 through the transition such that the phase at the start of data symbol 626 is the same as that at the end of data symbol 628 (ΔΦ=0).

FIG. 6D illustrates a data symbol transition 636 from P-state symbols to P-state symbols, which as discussed above can represent a digital 1 bit. FIG. 6D illustrates two successive data symbols, symbols 638 and 640. Both data symbol 638 and data symbol 640 are illustrated as data symbol 500 as shown in FIG. 5A, which includes K=8 number of successive P-states 400 as shown in FIG. 4A. FIG. 6D illustrates the frequency of the signal ($f_{High}$ and $f_{Low}$) 642 and the phase 646 relative to the nominal signal. Data symbol 638 ends and data symbol 640 begins at transition 648. As shown in FIG. 6D, data symbol 638 (that includes successive P-states) smoothly transitions to data symbol 640 (that also includes successive P-states). As is illustrated, there are no discontinuities in phase 646. Further, there is no overall shift in phase 646 through the transition such that the phase at the start of data symbol 638 is the same as that at the end of data symbol 640 (ΔΦ=0).

The data transmission methods according to embodiments of this disclosure have several appealing features which result in the signal tone being undisturbed for practical purposes. In particular, as is indicated in FIGS. 6A through 6D, there are no phase discontinuities such as can occur with a simple FSK scheme. Further, as shown in FIGS. 6A through 6D, the signal waveform is balanced in that the total durations of signals at frequency $f_{High}$ and signals at frequency $f_{Low}$ do not vary with data modulation. This results in the average signal tone frequency being data independent and is always $f_{nom}$.

As is illustrated in FIGS. 6A through 6D, the signal waveform is balanced in the sense that there are no overall shifts in relative phase. As pointed out above, phase 608 of FIG. 6A, phase 620 of FIG. 6B, phase 632 of FIG. 6C, and phase 646 of FIG. 6D, the peak-to-peak phase deviation remains constant and shows no phase discontinuities or phase shifts through data transition. Further, as is illustrated in signal frequency 606 of FIG. 6A, signal frequency 618 of FIG. 6B, signal frequency 630 of FIG. 6C, and signal 642 of FIG. 6D has properly balanced $f_{High}$ and $f_{Low}$ that the overall average signal frequency is $f_{nom}$. The sub-carrier frequency for data transmission can also easily be set outside the signal tone locating band while still allowing a useful data rate.

Figure 7:
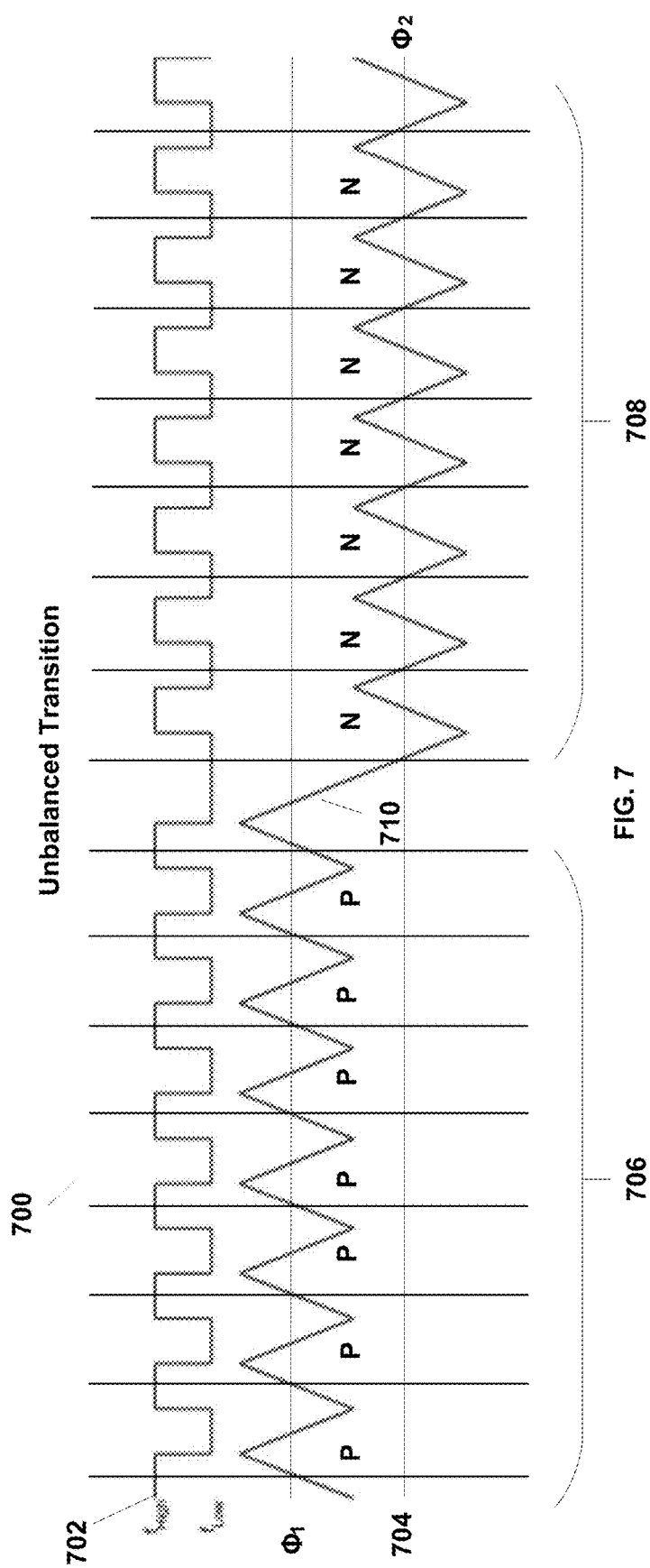
FIG. 7 illustrates an example of an unbalanced transition.

FIG. 7 illustrates an example of an unbalanced transition 700 between a series of P-states to a series of N-states. As shown in FIG. 7, signal frequency 702 and phase 704 illustrate the transition, similar to what would occur in, for example, Manchester coding. Signal frequency 702 and phase 704 illustrate a first section 706 that exhibits a series of P-state signals as illustrated above in FIG. 4A and a second section 708 that exhibits a series of N-state signals as illustrated above in FIG. 4B. First section 706 and second section 708 are separated by transition section 710.

As is illustrated in transition section 710, however, in transition section 710 the signal frequency 702 shows that the signal is at frequency $f_{Low}$ for a period of time long enough that the average frequency shifts from frequency $\Phi_1$ to frequency $\Phi_2$. This is a shift in the average phase of $\Delta\Phi=\Phi_2-\Phi_1$. This phase shift disturbs the detected signal tone due to the unfortunate timing of the transition. The resulting phase shift $\Delta\Phi$ and the disturbance in the average frequency results in signal degradation.

The transition illustrated in FIG. 7 can, for example be, Manchester coding of 8 ones followed by 8 zeros (or vice versa depending on polarity). It will clearly cause a data dependent disturbance of the detected signal tone as discussed above The transitions illustrated in FIGS. 6A through 6D, as discussed above, provide for smooth transitions with no shifts in the average phase throughout transmission of data. Further, the average frequency of the signal remains at $f_{nom}$. Consequently, the sub-carrier frequency can also easily be set outside the signal tone locating band while still allowing a useful data rate.

An advantage of using transitions to mark data zeros is as illustrated in FIGS. 6A and 6B is that the receiving device, receiver 300, does not need to determine the absolute phase of the sub-carrier (or indeed the signal tone) since P-to-N and N-to-P transitions are equivalent. On the other hand, if no transitions at all are detected, as is illustrated in FIGS. 6C and 6C, then this represents a stream of data ones. In some embodiments of the framing structure, this situation may not be recognized as valid data.

The decoding stage, which can be implemented digitally in digital processing 312 or may have components provided in both AFE 310 and Digital processing 312 of receiver 300 as illustrated in FIGS. 3A and 3B, is dependent on a suitably designed data framing scheme. Embodiments of the present disclosure deploy a well-matched data framing scheme. Characteristics of such a data framing scheme can include the following: maximizing the data opportunity (the information bandwidth being sufficient to effectively transmit data); maximizing the Signal-to-Noise Ratio (SNR) and consequently the transmission distance that can be attained; allowing the decoding system to latch on to the demodulated signal, regardless of where it may start in the data frame; and guaranteeing phase markers to assist in synchronizing to the data frames. A particular example of such a frame is illustrated in FIGS. 8A and 8B.

Figure 8A:
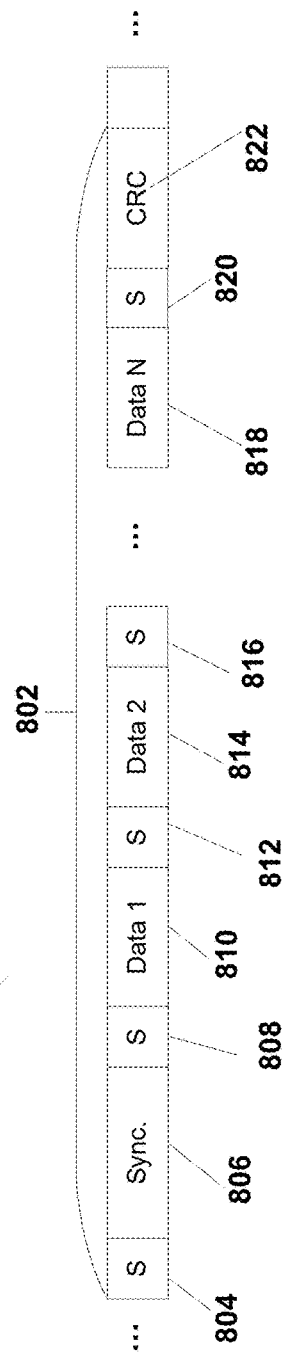
FIG. 8A illustrates a data transmission frame according to some aspects of the present disclosure.

FIG. 8A illustrates a bit stream 800 using the bit representations as illustrated in FIGS. 6A through 6D. Bit stream 800 may include a series of data frames 802 as is further illustrated. In some embodiments, bit stream 800 may be a continuous series of data frames 802. In some embodiments, bit stream 800 may have sporadic sequences of one or more data frames 802. As illustrated in FIG. 8A, data frame 802 can include any number of individual bits, starting with a separator bit 804 followed by a synchronization field 806, and one or more data fields data 1 810 through data N 818. The synchronization field 806 and the one or more data fields (data 1 810, data 2 814, through data N 818) are each separated by a separator (separators 808, 812, and 816, respectively. In some embodiments, a cyclic redundancy check (CRC) field, separated by separator 820 from the last data field data N 818, finishes data frame 802. The separator 804 followed by the synchronization field 806 provides a unique identifier that the receiver can use to identify the start of data frame 802. Consequently, synchronization field 806 is configured such that particular sequence of bits cannot recur elsewhere in data frame 802.

Figure 8B:
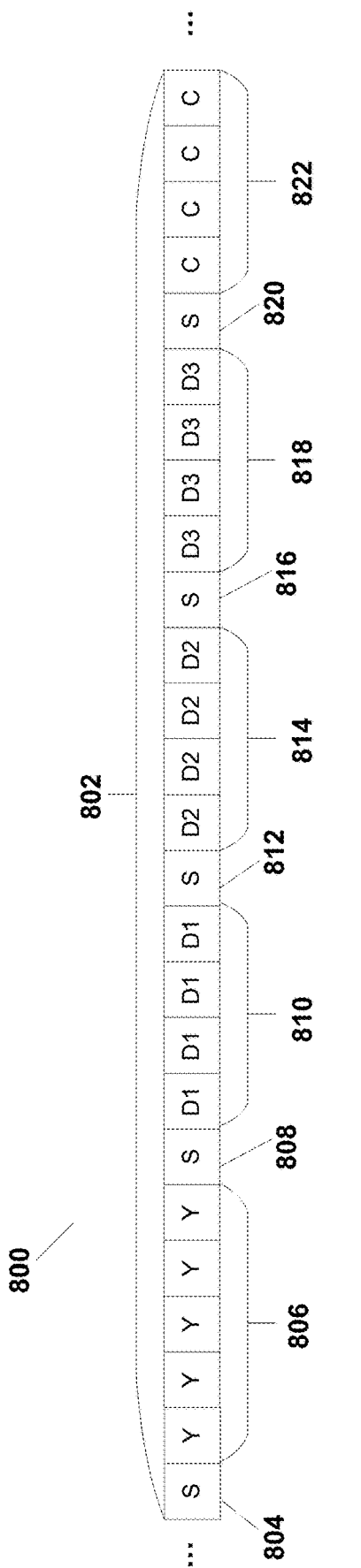
FIG. 8B illustrates a particular example of the data transmission frame illustrated in FIG. 8A.

For illustrative purposes, a particular example of data frame 802 is illustrated in FIG. 8B. In the example illustrated in FIG. 8B, frame 802 includes 26 bits, however as discussed above frame 802 may include any number of overall bits. As discussed above, frame 802 starts with a separator followed by a synchronization field, one or more data bit fields, and a cyclic redundancy check (CRC) field, each separated by a separator. In some embodiments, the synchronization field includes a different number of bits than are included in the one or more data bit fields or the CRC field so that the synchronization field is easily distinguishable within frame 802.

In the particular example of bit frame 802 illustrated in FIG. 8A, bit frame 802 starts with a separator bit 804 followed by synchronization bits 806, designated as Y in FIG. 8A. There may be any number of synchronization bits in frame 802, but in the example illustrated in FIG. 8B there are five (5) synchronization bits 806.

Synchronization bits 806 are followed by another separator 808 and then data field 810, which includes four bits labeled $D_1$. Data field 810 is followed by another separator 812 and then another data field 814, which includes four bits labeled $D_2$. Data field 814 is followed by a separator 816 and a third data field 818, which includes four bits labeled $D_3$. Data field 818 is followed by a separator 820 and CRC field 822, which includes four bits labeled C. As is illustrated in FIG. 8B, separators 804, 808, 812, 816, and 820 can consist of a single bit, which in some embodiments is a 0 as illustrated in FIGS. 6A and 6B. Synchronization 806 can be a five-bit field. In some embodiments, the five bits can all be a 1 as is illustrated in FIGS. 6C and 6D. Data bits 810, 814, 818, and CRC field 822 can be four-bit fields that will be represented as a combination of zeros and ones representing the transmitted data. In some embodiments, data can be sent continuously in fixed length frames with no gaps between frames 802. In the particular example of the 26-bit frame illustrated in FIG. 8B, the data frame 802 can have the following format:

SYYYYYSD$_1$D$_1$D$_1$D$_1$SD$_2$D$_2$D$_2$D$_2$SD$_3$D$_3$D$_3$D$_3$SCCCC.

In a particular frame structure applicable to sonde applications, the frame 802 structure is defined in the following table:

| Item | Data Element | Resource |
| --- | --- | --- |
| Separator | S | 1 bit |
| Sync | YYYYY | 5 bits |
| Separator | S | 1 bit |
| Pitch Data | D$_1$D$_1$D$_1$D$_1$ | 4 bits |
| Separator | S | 1 bit |
| Pitch Data | D$_2$D$_2$D$_2$D$_2$ | 4 bits |
| Separator | S | 1 bit |
| Roll Data | D$_3$D$_3$D$_3$D$_3$ | 4 bits |
| Separator | S | 1 bit |
| CRC | CCCC | 4 bits |
| Total | | 26 bits |

In some embodiments, the separator fields are a zero bit. The regular insertion of zero separator bits (phase inversion) allows the receiving device 300 to synchronize with the bit stream. The sync field 806 includes a different number of bits than is provided in data fields 810, 814, 818 or CRC field 822. In the example illustrated in FIG. 8B, sync flag 806 includes five (5) bits, all of which are ones, while data fields 810, 814, 818 and CRC field 822 each include four (4) bits. This guarantees that the sync field 806 (for example of five ones) can only occur at the start of a frame 802 and cannot be emulated in any of the data fields 810, 814, 818, or 822. Consequently, frame 802 can be used to send pitch and roll data as detected by sensors 342 of a sonde 340.

In particular, the pitch data can be the pitch angle detected in sensors 342 coded in 8 bits of data fields 810 and 814. In particular, in embodiments where data fields 810 and 814 are each 4 bit fields, the 8 data bits in data fields 810 and 814 can represent the pitch angle in degrees as a two's complement number in the range −90 to +90. Data is generally sent most-significant-bit (MSB) first.

Roll data as measured by sensors 342 can be represented in data field 818. In embodiments where data field 818 is a 4-bit field, 16 equally spaced roll orientation angles in increments of 22.5 degrees can be represented.

The CRC field 822 allows for an appended CRC. In examples where the sync field 806 is five-bits and each of data fields 810, 814, and 818 are four bits, the sending sonde 320 computes the CRC on the 17 data bits from first separator 804 to separator 820, i.e. the whole frame apart from the CRC itself and the separator bits. In the particular example provided here, the CRC field 822 can be four bits generated by a polynomial, for example the polynomial 0x03=x4+x+1. In some embodiments, there is no seed value or XOR. Consequently, the CRC of an error-free 21-bit frame equals zero.

Figure 8C:
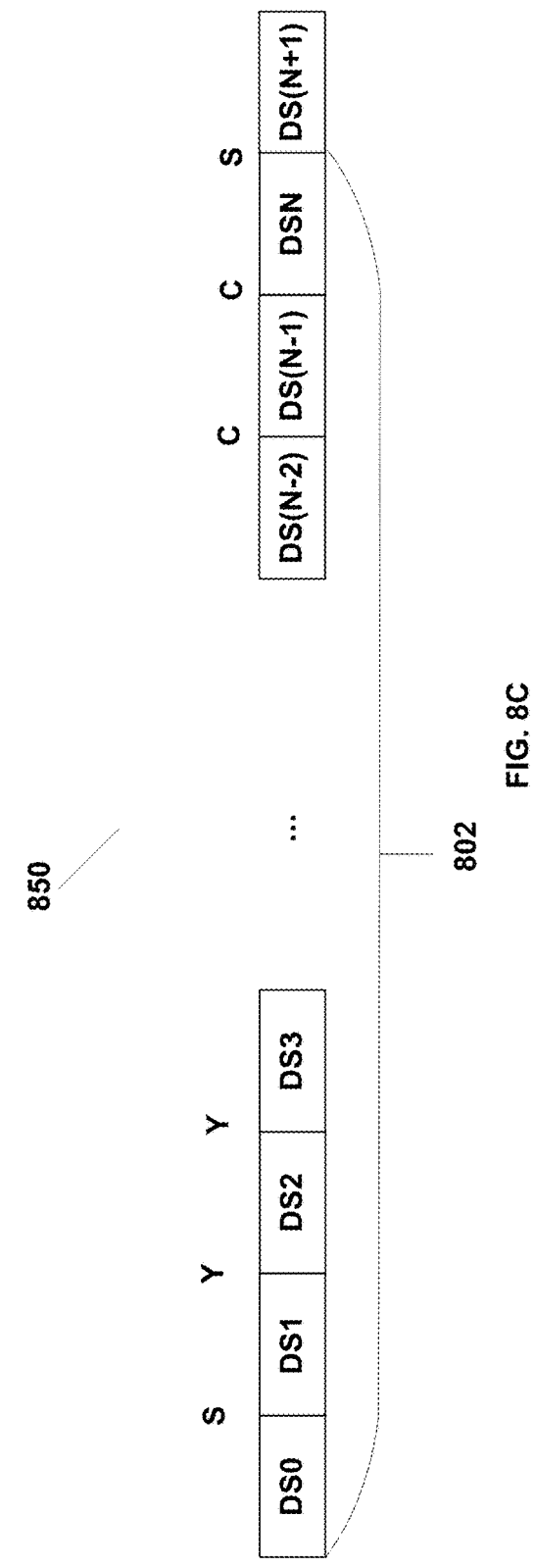
FIG. 8C illustrates a series of data symbols corresponding to the data transmission frame illustrated in FIG. 8B.

FIG. 8C illustrates that data symbol stream 850 that corresponds with the data frame 802 illustrated in FIG. 8B. As illustrated in FIG. 8C, data symbol stream 850 begins at symbol DS0, which is also the last data symbol in the previously transmitted frame 802. The separator 804, which as discussed above is a 0, is illustrated in the data symbol transition between DS0 and DS1 according to that discussed above with FIGS. 6A and 6B (i.e. if DS0 is a data symbol of N-states then DS1 is a data symbol of P-states and if DS0 is a data symbol of P-states then DS1 is a data symbol of N-states). Since synchronization field 806 is a series of 1's, then DS2 through DS6 are all the same as DS1. DS6 to DS7, however, designates separator 808, which is a 0 bit, and therefore DS7 is a data symbol that is the complement of DS6 (i.e. if DS6 is a data symbol of N states, then DS7 is a data symbol of P states whereas if DS 6 is a data symbol of P states, then DS7 is a data symbol of N states). The data symbols in data symbol series 850 are then designated to corresponded to the remaining bits in data frame 802 according to the bit representations illustrated in FIGS. 6A through 6D. The last data symbol in data frame 802 is then DSN, which in a 26 bit data frame N=26. The last data frame DSN is then the data frame that starts the next transmitted frame 802, where separator 804 of the next frame is represented by the transition between data symbols DSN and DS(N+1).

Consequently, a receiver can synchronize with the data transmission. The receiver locates a separator 804 followed by synchronization field 806 in the bit stream, which will identify the beginning of a data frame 802. As discussed above, in the particular example illustrated in FIG. 8B and discussed above, the bit sequence "011111" uniquely identifies the beginning of a data frame 802 and cannot occur elsewhere in data frame 802. Once synchronized, a receiver can then continuously receive data frames according to FIG. 8C and the transitions discussed in FIGS. 6A through 6D.

As illustrated in FIG. 3B, receiver 300 can process data from antenna 334 to demodulate data transmitted as discussed above. As discussed above, antenna 334 can be a triaxial antenna. The signals from antennas 304 and 306 are processed by AFE 310 and digitized to input to digital processing 312. As discussed above, much of the demodulation process can be achieved in digital processing 312.

Figure 9A:
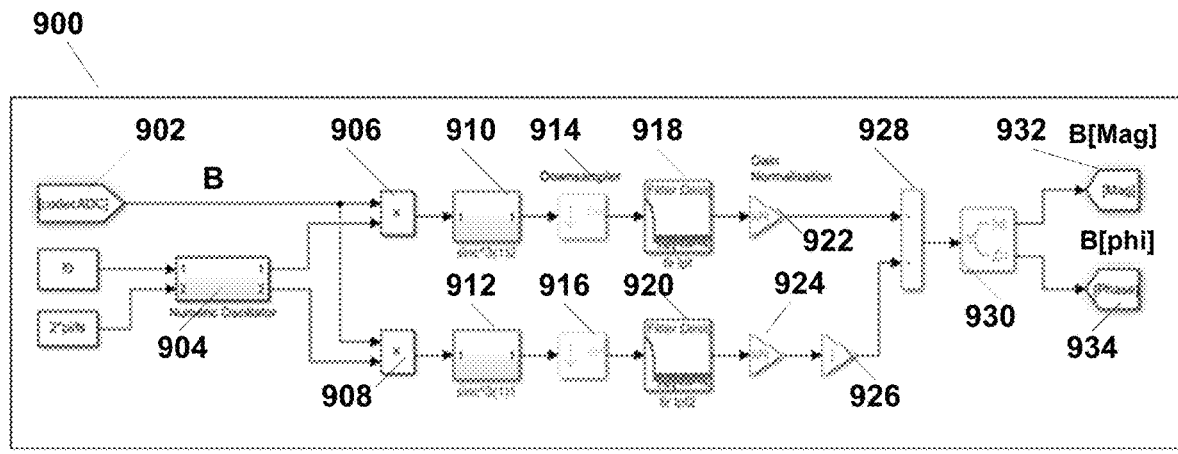
FIGS. 9A and 9B illustrates section of the digital signal processing illustrated in FIG. 3B.
Figure 9B:
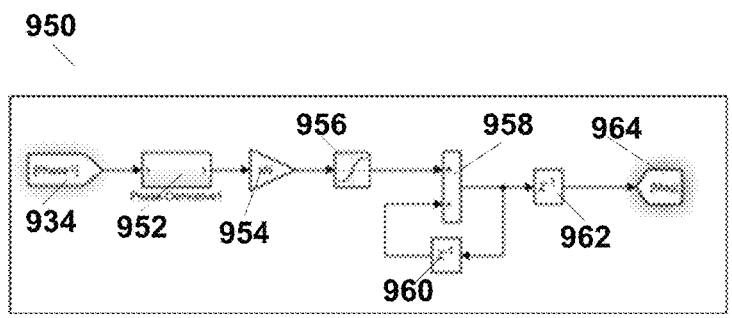

FIGS. 9A and 9B illustrate an example of phase coherent narrow band digital signal processing, which determines a magnitude and phase of one of the three signals from antenna 334 illustrated in FIG. 3B (i.e. BH1, BH2, and BV). FIG. 9A illustrates a narrow band decimating filter 900. FIG. 9B illustrates a local oscillator tracking circuit 950 that can be used with filter 900 of FIG. 9A.

As illustrated in FIG. 9A, an analog-to-digital converter (ADC) 902, which is part of the AFE of AFE 310, provides digital data from a given CODEC ADC channel from one of the signals BH1, BV, or BH2, here labeled B. The remaining components illustrated in FIG. 9A are aspects of one of the corresponding one of the signal processing 322 as illustrated in FIG. 3B. It should be noted that other antennas in wand 302 may include antennas that produce any number of magnetic signals that can be processed in a similar fashion as that described here.

The sampling rate at ADC 902 can be anything from 10 kHz to 192 kHz—the typical bands for a Sigma Delta Audio Codec. A numerical oscillator 904 can provide stable and phase-locked sine and cosign outputs at the carrier frequency $f_0$. Numeric oscillator 904 can operate similar to that described in U.S. Pat. No. 4,285,044. As shown in FIG. 9A, the digitized data signal from ADC 902 is mixed with a sine output of numeric oscillator 904 in mixer 906 and mixed with a cosine output of numeric oscillator 904 in mixer 908. Consequently, the output signals from mixers 906 and 908 provide in-phase and quadrature signals for processing. The algorithm exhibited in FIG. 9A, therefore, uses complex signals (In Phase and Quadrature Phase), which allows phase information to be carried through to the output.

The signals from mixers 906 and 908 are then down sampled. FIG. 9A illustrates a SINC3 decimating stage. In the decimating stage, the output signal from mixer 906 is processed through a SINC3 filter 910, a down sampler 914, and a low-pass filter 918. Furthermore, the output signal from mixer 908 is processed through a SINC3 filter 912, a down sampler 916, and a low-pass filter 920. In some embodiments, the down sampling bandwidth, for example, can be in the region of 50 Hz to 150 Hz, which is suitable for user interface 314.

Low-pass filters 918 and 920 can both be finite impulse response (FIR) filters that define the overall frequency response and bandwidth. For example, in some embodiments the frequency response of the FIR filters can be set to about 1 Hz. As is further illustrated in FIG. 9A, the output signal from filter 918 is input to amplifier 922 and the output signal from filter 920 is input to amplifier 924. Amplifiers 922 and 924 provide gain normalization. As is further illustrated in FIG. 9A, the output signal from amplifier 924 is inverted in inverter 926. The in-phase and quadrature signals from amplifier 922 and inverter 926, respectively, are input to combiner 928. The combined signal is input to processing block 930 where magnitude 932 and phase 934 are calculated from the in-phase and quadrature signals input to combiner 928. As shown in FIG. 3B, signals 932 and 934 are input to locate processing 328 and, combined with similar signals from other antennas in wand 302, is used to locate sonde 340.

FIG. 9B illustrates a local oscillator tracker 950 that can be used with decimating filter 900. Local oscillator tracker 950 forms a closed loop integral control law, the output of which adjusts the numeric oscillator 904 by a small amount until the error is negligible. This allows the receiver to be frequency locked to the transmission waveform and is important for the data encoding scheme described in further detail below.

As illustrated in the example local oscillator tracker 950 illustrated in FIG. 9B, the phase output signal 934 from decimating filter 900 is differentiated in phase derivative block 952. The result of block 952 is amplified in amplifier 954 and the result in input to integrator 956. The result of integrator 956 is input to a combiner 958. The output signal from combiner 958 is delayed in delay 960 and combined with the output signal from integrator 956 in combiner 958. The output signal from combiner 958 is again delayed in delay 962 and output to error correction 964. Error correction 964 can be input to numeric oscillator 904 illustrated in FIG. 9A to adjust the average frequency $f_0$ so that the average overall phase is minimal.

With the modulation scheme illustrated in FIGS. 6A through 6D above, local oscillator tracker 950 will move the oscillators to the effective average of the two frequency components:

$$F_{avge} = \frac{2 \cdot F_{LOW} \cdot F_{High}}{F_{LOW} + F_{High}}$$

As discussed above, the average of the frequency signals according to the modulation scheme illustrated in FIGS. 6A through 6D, the average frequency $F_{avge}$ is the nominal frequency $f_{nom}$ of the locating signal tone.

Figure 10A:
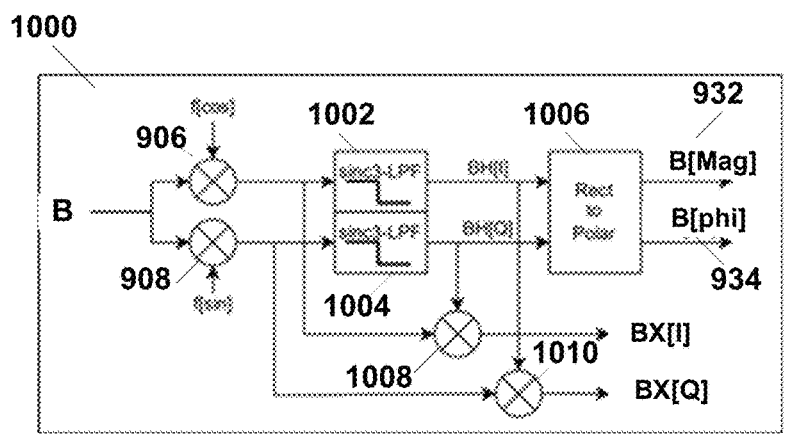
FIGS. 10A, 10B, and 10C illustrate aspects of digital data demodulation according to aspects of the present disclosure.
Figure 10B:
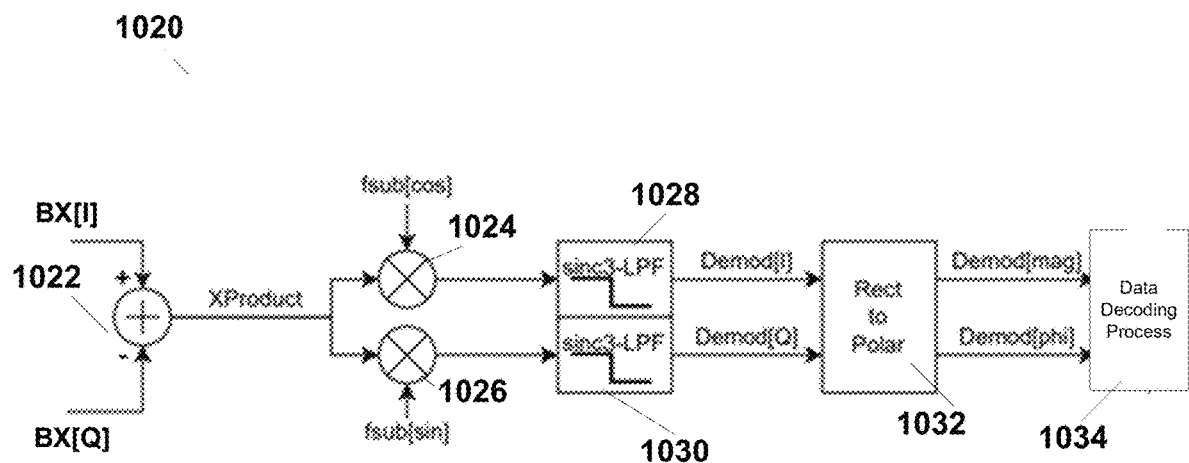
Figure 10C:
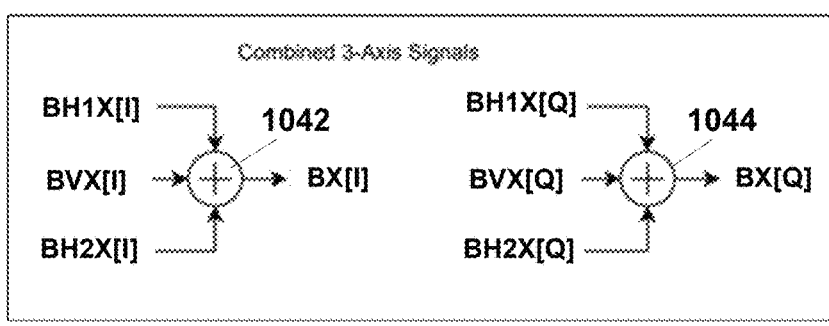

Demodulation of data transmitted by embodiments of the present disclosure is illustrated in FIGS. 10A through 10C. FIG. 10A illustrates a first stage 1000 of the demodulation process. First stage 1000 works with narrow band decimating filter 900 as illustrated in FIG. 9A. As shown in FIG. 9A, the digitized signal B, which one of the signals from an antenna such as antenna 334, is input to multipliers 906 and 908 and mixed with a cosine and sine signal to generate in-phase and quadrature signals. The signal from multiplier 906 is input to SINC3 decimator 1002, which includes SINC3 filter 910, down sampler 914, and low-pass filter 918 as illustrated in FIG. 9A. The signal from multiplier 908 is input to SINC3 decimator 1004, which includes SINC3 filter 912, down sampler 916, and low-pass filter 920 as illustrated in FIG. 9A. Processor 1006, rectifier and polar compute, represent elements 922, 924, 926, 928, and 930 illustrated in FIG. 9A. As discussed previously, processor 1006 outputs the magnitude and phase of the signal B (B[mag] 932 and B[phi] 934) for further processing.

The first stage 1000 of the demodulation uses a simple cross multiply to generate a sub-carrier channel—effectively an intermediate tone, labelled BX[I] and BX[Q]. As is illustrated in FIG. 10A, the output signal from multiplier 906 is input to multiplier 1008 and mixed with the output signal from SINC3 decimator 1002 to form the output signal BX[I]. Similarly, the output signal from multiplier 908 is input to multiplier 1010 and mixed with the output signal from SINC3 decimator 1004 to form the output signal BX[Q].

The data encoding scheme described herein can be considered a frequency shift key arrangement. Consequently, the phase domain of the modulation appears as an orthogonal signal as represented by a Phasor on the Argand diagram. Accordingly, the demodulation uses a Vector Cross product of the Cartesian components as shown in FIG. 10B. As illustrated in the example of second stage 1020, the signals BX[I] and BX[Q] illustrated in FIG. 10A are input to vector cross product 1022 to form a cross product signal. The cross product signal is then input to multiplier 1024 and multiplier 1026. In multiplier 1024 the cross product signal is mixed with the cosine signal $f_{sub}$[cos] and in multiplier 1026 the cross product signal is mixed with the sine signal $f_{sub}$[sin]. The signals $f_{sub}$[cos] and $f_{sub}$[sin] are generated by a numeric oscillator that is running at the sub-carrier frequency. In this example it is notionally, the sub-carrier frequency $f_{sub}$ is the average, or nominal, frequency $f_{avg}$/M. In the particular examples illustrated here, as illustrated above in FIGS. 4A and 4B, M=16. Consequently, in the specific examples discussed above, the sub-carrier frequency can be given by $$f_{sub} = f_{avg}/16$$

The output signal from multiplier 1024 is input to a SINC3 decimating filter 1028. The output signal from multiplier 1026 is input to a SINC3 decimating filter 1030. The output signals from SINC3 decimating filters 1028 and 1030, demod[I] and demod[Q] respectively, is input to rectifier circuit 1032. As illustrated in FIG. 10B, rectifier circuit 1032 outputs the demodulated magnitude and phase.

The bandwidth used in the demodulation stage is set accurately to ensure it is sufficiently wide to pass the data-information bandwidth without degradation. The demodulated magnitude is fed to the data decoding process 1034 to determine the phase characteristics as described in FIGS. 4A and 4B. Data decoding processor 1034 can then determine N-state or P-state characteristics, and ultimately the transitions between data symbols as described in FIGS. 6A through 6D.

The example illustrated in FIGS. 10A and 10B use a single magnetic field signal B, which can be one of the signals from antenna 334 (BH1, BH2, and BV). As discussed above, antenna 334 can be a triaxial antenna that includes three orthogonally oriented coils for measuring the magnetic field in three orthogonal directions. As illustrated in FIG. 3B, antenna 334 includes two orthogonal horizontal coils that produces signals BH1 and BH2 related to the magnetic field strength in two orthogonal horizontal directions and a vertically oriented coil that produce signal BV related to the magnetic field strength in the vertical direction. In some embodiments, in order to improve the detection of the data signal, all of the signals from antenna 334 can be used to demodulate the data signal in FIG. 10B.

Each of the signals BH1, BH2, and BV from antenna 334 can be processed through parallel first stages 1000 as illustrated in FIG. 10A. This provides signals BH1X[I] and BH1X[Q] corresponding to input signal BH1, BH2X[I] and BH2X[Q] corresponding to input signal BH2, and signals BVX[I] and BVX[Q] corresponding to input signal BV. BH1X[I] is the In-Phase component of the Sub-Carrier tone derived from a horizontal-oriented coil of antenna 334. BVX[I] is the In-Phase component of the Sub-Carrier taken from the vertically oriented coil of antenna 334. BH2X[I] is the In-Phase component of second horizontally oriented coil of antenna 334. BH1X[Q], BVX[Q] and BH2X[Q] are the quadrature components of signals BH1, BV, and BH2, respectively.

As is illustrated in FIG. 10C, the in-phase signals BH1X[I], BVX[I], and BH2X[I] are combined in summer 1042 to produce a combined signal BX[I]. The quadrature signals BH1X[Q], BVX[Q], and BH2X[Q are combined in summer 1044 to produce a combined signal BX[Q]. The combined signals BX[I] and BX[Q] are input into second stage 1020 as indicated in FIG. 10B. Consequently, FIG. 10C allows a method of performing the demodulation on all three (3) axes as measured in antenna 334 without causing contention or any loss of signal-to-noise ratio.

On first inspection, it may be thought that the summation of signals as illustrated in FIG. 10C would add noise to the demodulation process as a consequence of increasing the overall noise aperture of the system. This has been shown not to be the case, the orthogonal nature of the vector cross product affected by cross product 1022 handles this effectively and allows the demodulation process to run smoothly regardless of which antenna may be carrying the dominant signal.

Figure 11:
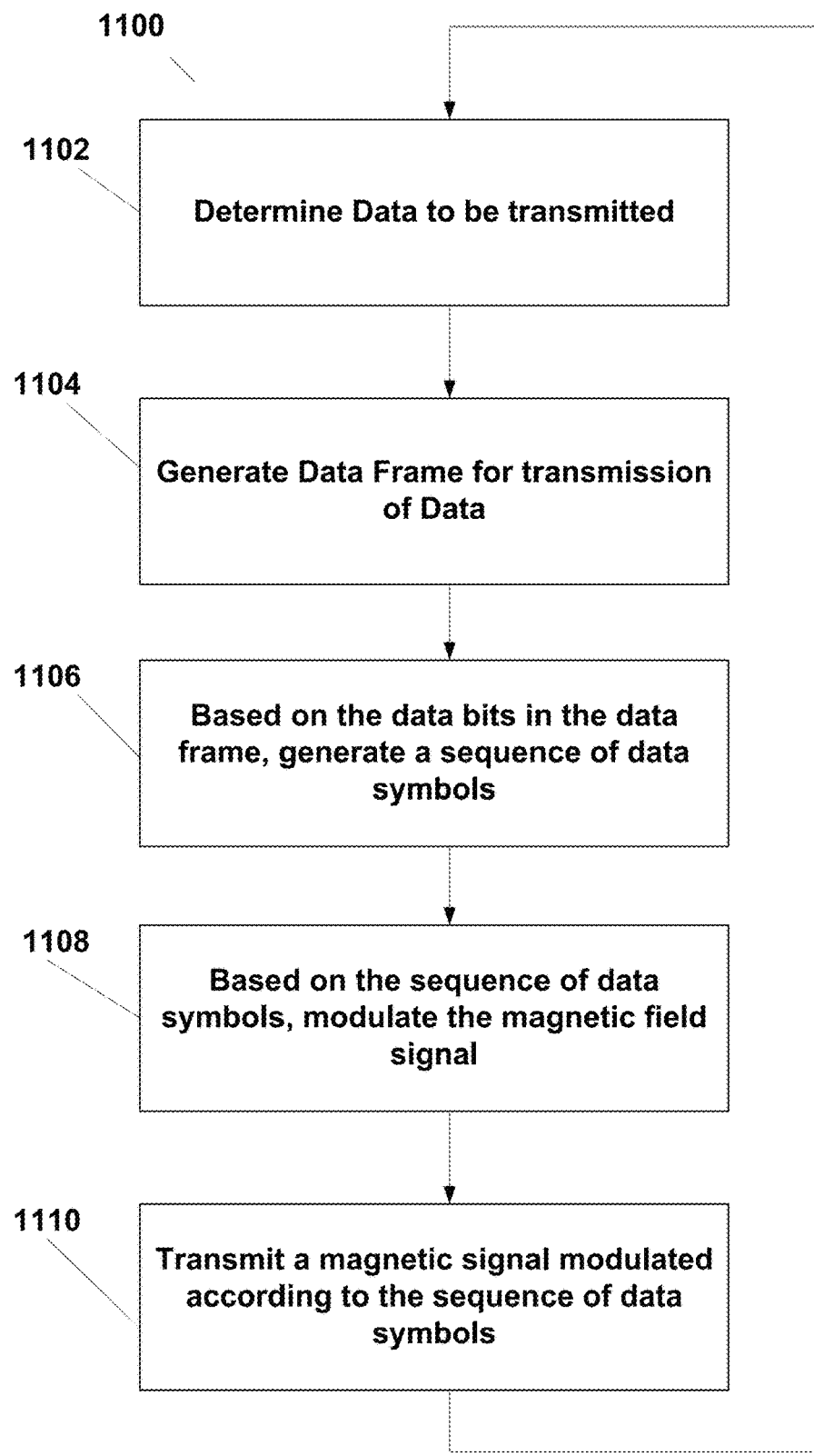
FIG. 11 illustrates operation of a sonde according to some embodiments of the present disclosure.

FIG. 11 illustrates operation 1100 of a sonde 340 as illustrated in FIG. 3C according to some embodiments of the present disclosure. As illustrated, operation 1100 may be executed by processor 344, at least partially according to instructions stored in a memory of processor 344. In step 1102 of processor 1100, processor 344 receives parameters from sensors 342. As discussed above, the data can include pitch and roll data for sonde 340, although other parameters may also be monitored. In step 1104, a data frame such as data frame 802 illustrated in FIG. 8A is assembled to include data representing the parameters received in step 1102. In step 1106, based on the data frame 802 generated in step 1104, a sequence of data symbols is generated according to that described in FIG. 8B. In step 1108, the sequency of frequency modulations as illustrated in FIGS. 4A and 4B and FIGS. 5A and 5B corresponding to the data symbol sequence generated in step 1108 is determined. Finally, in step 1110, processor 344 provides input to driver 346 to drive antenna 348 to transmit the magnetic symbol according to the modulation determined in step 1108. As should be understood, the timing of these sequences is such that a continuous sequence of data frames 802 is transmitted on the magnetic signal generated by sonde 340.

Figure 12:
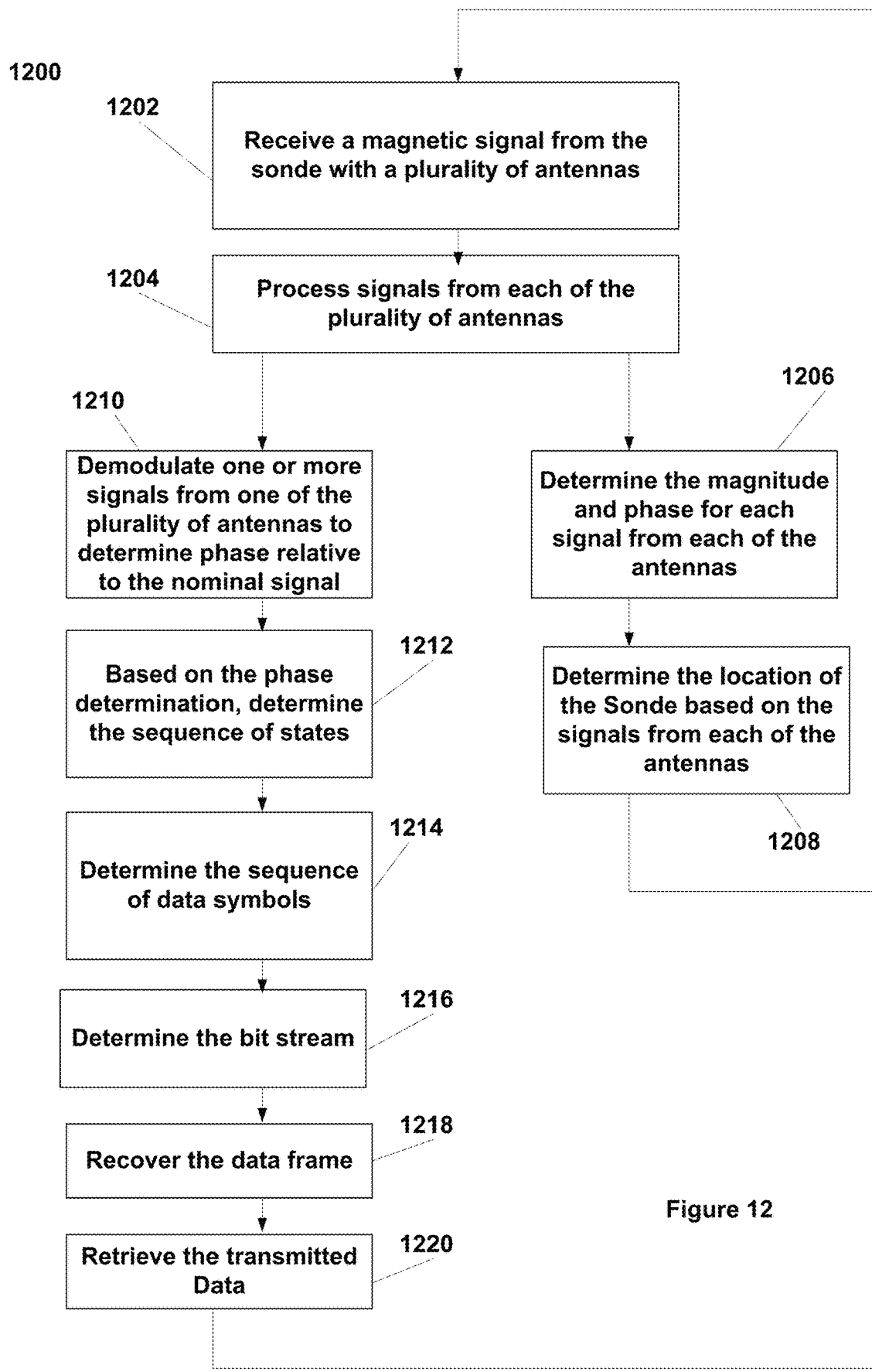
FIG. 12 illustrates operation of a receiver according to some embodiments of the present disclosure.

FIG. 12 illustrates operation 1200 of a receiver 300 according to some embodiments of the present disclosure. Receiver 300, as illustrated in FIGS. 3A and 3B, includes components as illustrated in 9A, 9B, 10, 10B, and 10C. In particular, these operations may be executed by various aspects of digital processor 312.

As shown in FIG. 12, in step 1202 of operation 1200 receiver 300 receives the magnetic signal generated by sonde 340 with a plurality of antennas. As illustrated in FIGS. 3A and 3B, each of the plurality of antennas may generate one or more signals associated with the magnetic field strength and direction at receiver 300. For example, as is illustrated in FIG. 3B, one or more of the antennas, for example antenna 344, can be a triaxial antenna that receives signals according to the magnetic field strengths in two orthogonal horizontal directions and one vertical direction. In step 1204, the signals from each of the antennas are processed and digitized and input to digital processor 312, which performs the remainder of the operations in operation 1200.

As illustrated in FIG. 12, digital processor 312 can determine the magnitude and phase of each of the signals from each of the antennas in step 1206 as is described with FIGS. 9A and 9B. In step 1208, receiver 300 can then determine the physical location of sonde 340 based on the signals received from the plurality of antennas.

Steps 1210 through 1218 describe demodulating the received signals from the antennas to recover the digital bit stream that was modulated onto the magnetic signal by sonde 340. In step 1210, one or more signals from one of the antennas is demodulated as illustrated in FIGS. 10A through 10C to determine the phase relative to the nominal signal. In step 1212, from the phase determination, individual states are determined. As is discussed above, the states are M cycles designating an N-state or a P-state. In step 1212, receiver 300 detects the transition from an N-state to a P-state or a P-state to an N-state, which indicates the beginning of individual states and from which the sequence of individual states can be determined.

In step 1214, the sequence of data symbols as illustrated in FIG. 8B can be determined. Locating a 0 bit transition as has been accomplished in step 1214 also indicates the start of a data symbol. Consequently, the sequence of data symbols can be determined.

In step 1216, from the sequence of data symbols, the bit stream can be determined. From a 0 transition, setting the demarcation between two states and also the demarcation between two data symbols, the data symbols are recovered. In step 1218, receiver 300 can then locate the synchronization field "11111" that indicates the beginning of a data frame 802. Once that is located, receiver 300 then recovers the series of data frames 802 that are being transmitted by sonde 340.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A method of transmitting digital data from a sonde, comprising:
    determining data to be transmitted;
    generating a bit stream based on the data to be transmitted; and
    transmitting a magnetic signal that is modulated with the bit stream, the magnetic signal having a nominal frequency and being formed of a first signal having a high frequency and a second signal having a low frequency, the high frequency being higher than the nominal frequency and the low frequency being lower than the nominal frequency, the nominal frequency being the average frequency of the magnetic signal,
    wherein the bit stream is modulated onto the magnetic signal by encoding the bit stream into the magnetic signal, where each bit in the bit stream is represented by a transition between adjoining data symbols, each of the data symbols is formed of K repetitions of one of a first state or a second state, where the first state of the pair of states includes M/2 cycles of the nominal frequency with a signal at the high frequency and M/2 cycles of the nominal frequency with a signal at the low frequency, and where a second state of the pair of states includes signals complementary to the first state.

2. The method of claim 1, wherein transitions representing a digital one bit is encoded with a first data symbol of the adjoining symbols formed with the first state and a second data symbol of the adjoining symbols formed with the first state or the first data symbol formed with the second state and the second data symbol formed with the second state.

3. The method of claim 2, wherein transitions representing a digital zero bit is encoded with the first data symbol formed with the first state and the second data symbol formed with the second state or the first data symbol formed with the second state and the second data symbol formed with the first state.

4. The method of claim 3, wherein the bit stream is formed into a continuous sequence of data frames, each data frame being formed with a separator followed by a synchronization field and one or more data fields, the synchronization field and the one or more data fields separated by a separator.

5. The method of claim 4, wherein the frame further includes a cyclic redundancy check (CRC) field separated from the last data field by a separator.

6. The method of claim 4, where the separator bits are zero and the synchronization bits are all ones.

7. The method of claim 4, further including reading pitch and roll data from the sonde and encoding the pitch and roll data into the one or more data fields.

8. The method of claim 7, wherein the one or more data fields includes a first data field, a second data field, and a third data field.

9. The method of claim 8, wherein pitch data is presented in the first data field and the second data field while roll data is presented in the third data field.

10. The method of claim 1, wherein the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

11. A method of transmitting data from a sonde, comprising:
measuring parameters associated with the sonde with sensors in the sonde;
encoding the parameters into a data frame, the data frame having a sequence of bits, the data frame including a separator followed by a synchronization field and one or more data fields separated by separators;
determining a sequence of data symbols to represent the data frame, each of the sequence of bits in the data frame being represented by transitions between adjacent data symbols in the sequence of data symbols, the data symbols each being formed by K repetitions of a first state or formed by K repetitions of a second state, where the first state includes M/2 cycles of a nominal frequency with a high frequency signal at a high frequency and M/2 cycles of the nominal frequency with a low frequency signal at a low frequency, the high frequency being higher than the nominal frequency and the low frequency being lower than the nominal frequency such that the average signal is at the nominal frequency; and
transmitting a magnetic signal formed from the sequency of data symbols.

12. The method of claim 11, wherein transitions representing a digital one bit is encoded with a first data symbol of the adjoining symbols formed with the first state and a second data symbol of the adjoining symbols formed with the first state or the first data symbol formed with the second state and the second data symbol formed with the second state.

13. The method of claim 12, wherein transitions representing a digital zero bit is encoded with the first data symbol formed with the first state and the second data symbol formed with the second state or the first data symbol formed with the second state and the second data symbol formed with the first state.

14. The method of claim 13, wherein the bit stream is formed into a continuous sequence of data frames, each data frame being formed with a separator followed by a synchronization field and one or more data fields, the synchronization field and the one or more data fields separated by a separator.

15. The method of claim 14, wherein the frame further includes a cyclic redundancy check (CRC) field separated from the last data field by a separator.

16. The method of claim 14, where the separator bits are zero and the synchronization bits are all ones.

17. The method of claim 15, further including reading pitch and roll data from the sonde and encoding the pitch and roll data into the one or more data fields.

18. The method of claim 16, wherein the one or more data fields includes a first data field, a second data field, and a third data field.

19. The method of claim 18, wherein pitch data is presented in the first data field and the second data field while roll data is presented in the third data field.

20. The method of claim 11, wherein the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

21. A sonde, comprising:
one or more sensors to measure parameters associated with the sonde;
an antenna configured to transmit a magnetic signal;
a driver coupled to drive the antenna to transmit a magnetic signal according to input signals; and
a processor coupled to the one or more sensors and the driver, the processor configured to
receive parameters associated with the sonde from the one or more sensors;
encode the parameters into a data frame, the data frame having a sequence of bits, the data frame including a separator followed by a synchronization field and one or more data fields separated by separators;
determine a sequence of data symbols to represent the data frame, each of the sequence of bits in the data frame being represented by transitions between adjacent data symbols in the sequence of data symbols, the data symbols each being formed by K repetitions of a first state or formed by K repetitions of a second state, where the first state includes M/2 cycles of a nominal frequency with a high frequency signal at a high frequency and M/2 cycles of the nominal frequency with a low frequency signal at a low frequency, the high frequency being higher than the nominal frequency and the low frequency being lower than the nominal frequency such that the average signal is at the nominal frequency; and
communicate the input signal corresponding to the sequence of data symbols to the driver.

22. The sonde of claim 21, wherein the parameters include roll and pitch data.

23. The sonde of claim 21, wherein the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

24. A method of receiving digital data from a magnetic signal transmitted by a sonde, comprising:
receiving a magnetic signal transmitted by the sonde, the magnetic signal having a nominal frequency and being formed of a first signal having a high frequency and a second signal having a low frequency, the high frequency being higher than the nominal frequency and the low frequency being lower than the nominal frequency, the nominal frequency being the average frequency of the magnetic signal;

digitizing the magnetic signal to provide a digitized magnetic signal; and processing the digitized magnetic signal to recover a bit stream, where each bit in the bit stream is represented by a transition between adjoining data symbols, each of the data symbols is formed of K repetitions of one of a first state or a second state, where the first state of the pair of states includes M/2 cycles of the nominal frequency with a signal at the high frequency and M/2 cycles of the nominal frequency with a signal at the low frequency, and where a second state of the pair of states includes signals complementary to the first state.

25. The method of claim 24, wherein processing the digitized magnetic signal to recover the bit stream includes demodulating the magnetic signal to determine phase relative to a nominal signal, the nominal signal being at the nominal frequency;

determining a sequence of data symbols; and determining the transitions between adjacent data symbols to determine the bit stream.

26. The method of claim 25, wherein demodulating the magnetic signal includes mixing the digitized magnetic signal with a sine and a cosine wave at a carrier frequency to obtain an in-phase and a quadrature signal;

filtering the in-phase and the quadrature signal with decimator filters;

mixing output signals from the decimator filters with the in-phase and quadrature signals to generate sub-carrier channel signals BX [I] and BX [Q];

combining the sub-carrier signals BX [I] and BX [Q] to form a cross product signal;

mixing the cross product signal with a sine and cosine signal at a subcarrier frequency;

filtering signals from the from the cross-product with a decimating filter to provide demodulated signals; and generating demodulated magnitude and phase signals from the demodulated signals.

27. The method of claim 26, further including combining the sub-carrier channel signals BX [I] and BX [Q] from a plurality of magnetic signals before combining to form the cross product signal.

28. The method of claim 27, wherein receiving the magnetic signal includes receiving magnetic signals from a triaxial antenna, the triaxial antenna producing signals related to the magnetic field in two orthogonal horizontal directions and a vertical direction, and wherein combining the sub-carrier channel signals includes generating sub-carrier channel signals for each of the signals; and combining the sub-carrier channel signals for each of the signals to generate the combined sub-carrier channel signals.

29. The method of claim 24, wherein transitions representing a digital one bit is encoded with a first data symbol of the adjoining symbols formed with the first state and a second data symbol of the adjoining symbols formed with the first state or the first data symbol formed with the second state and the second data symbol formed with the second state.

30. The method of claim 29, wherein transitions representing a digital zero bit is encoded with the first data symbol formed with the first state and the second data symbol formed with the second state or the first data symbol formed with the second state and the second data symbol formed with the first state.

31. The method of claim 30, wherein the bit stream is formed into a continuous sequence of data frames, each data frame being formed with a separator followed by a synchronization field and one or more data fields, the synchronization field and the one or more data fields each separated by a separator.

32. The method of claim 31, where the separator is a zero bit and the synchronization field includes all ones.

33. The method of claim 31, wherein the frame further includes a cyclic redundancy check (CRC) field separated from the last data field by a separator.

34. The method of claim 33, wherein the one or more data fields include a first data field, a second data field, and a third data field.

35. The method of claim 34, wherein pitch data is presented in the first data field and the second data field while roll data is presented in the third data field.

36. The method of claim 24, wherein the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

37. A receiver, comprising:

one or more antennas, each of the one or more antennas producing one or more signals related to a magnetic signal generated by a sonde;

an analog front end that receives and digitizes each of the one or more signals from each of the one or more antennas; and a digital processor configured to receive the digitized signals from the analog front end and recovering digital data modulated onto the magnetic field generated by the sonde, wherein the magnetic signal is modulated according to a bit stream, the magnetic signal having a nominal frequency and being formed of a first signal having a high frequency and a second signal having a low frequency, the high frequency being higher than the nominal frequency and the low frequency being lower than the nominal frequency, the nominal frequency being the average frequency of the magnetic signal, and wherein the bit stream is modulated onto the magnetic signal by encoding the bit stream into the magnetic signal, where each bit in the bit stream is represented by a transition between adjoining data symbols, each of the data symbols is formed of K repetitions of one of a first state or a second state, where the first state of the pair of states includes M/2 cycles of the nominal frequency with a signal at the high frequency and M/2 cycles of the nominal frequency with a signal at the low frequency, and where a second state of the pair of states includes signals complementary to the first state.

38. The receiver of claim 37, wherein the digital processor is configured to identify transitions representing a digital one bit that is encoded with a first data symbol of the adjoining symbols formed with the first state and a second data symbol of the adjoining symbols formed with the first state or the first data symbol formed with the second state and the second data symbol formed with the second state.

39. The receiver of claim 38, wherein the digital processor is configured to identify transitions representing a digital zero bit that is encoded with the first data symbol formed with the first state and the second data symbol formed with the second state or the first data symbol formed with the second state and the second data symbol formed with the first state.

40. The receiver of claim 39, wherein the bit stream is formed into a continuous sequence of data frames, each data frame being formed with a separator followed by a synchronization field and one or more data fields, the synchronization field and the one or more data fields separated by a separator.

41. The receiver of claim 40, where the separator bits are zero and the synchronization bits are all ones.

42. The receiver of claim 40, wherein the frame further includes a cyclic redundancy check (CRC) field separated from the last data field by a separator.

43. The receiver of claim 40, further including reading pitch and roll data from the sonde and encoding the pitch and roll data into the one or more data fields.

44. The receiver of claim 43, wherein the one or more data fields include a first data field, a second data field, and a third data field.

45. The receiver of claim 44, wherein the digital processor is configured to recover pitch data that is presented in the first data field and the second data field and roll data that is presented in the third data field.

46. The receiver of claim 45, wherein the first state includes M/4 cycles of signal at the high frequency followed by M/2 cycles of signal at the low frequency and then M/4 cycles of signals at the high frequency; and wherein the second state includes M/4 cycles of signal at the low frequency followed by M/2 cycles of signal at the high frequency and then M/4 cycles of signals at the low frequency.

47. The receiver of claim 37, wherein the digital processor recovers digital data based on a single signal from one of the antennas.

48. The receiver of claim 37, wherein one of the antennas is a triaxial antenna and the digital processor is configured to recover digital data based on three signals from the triaxial antenna.

* * * * *